US012549531B2

(12) United States Patent
Zimny

(10) Patent No.: US 12,549,531 B2
(45) Date of Patent: Feb. 10, 2026

(54) PEER RECOVERY PROCEDURES FOR ACCESS RECOVERY AND ACCESS CONTROL

(71) Applicant: Ping Identity International, Inc., Denver, CO (US)

(72) Inventor: Marcin Zimny, Nottingham (GB)

(73) Assignee: Ping Identity International, Inc., Denver, CO (US)

( * ) Notice: Subject to any disclaimer, the term of this patent is extended or adjusted under 35 U.S.C. 154(b) by 185 days.

(21) Appl. No.: 18/503,114

(22) Filed: Nov. 6, 2023

(65) Prior Publication Data

US 2025/0080517 A1 Mar. 6, 2025

Related U.S. Application Data

(60) Provisional application No. 63/535,537, filed on Aug. 30, 2023.

(51) Int. Cl.
*H04L 9/40* (2022.01)
(52) U.S. Cl.
CPC .................. *H04L 63/08* (2013.01)
(58) Field of Classification Search
CPC ................ H04L 63/08; H04L 63/0815; H04L 2463/082
See application file for complete search history.

(56) References Cited

U.S. PATENT DOCUMENTS

2018/0176222 A1* 6/2018 Bhaskar .............. H04L 63/0815
2024/0380746 A1* 11/2024 Bowman ............. H04L 63/0823

OTHER PUBLICATIONS

Zimny, Marcin, "Trust vs Authority in Access Recovery Procedures", IAM World, Marcin's Identity and Access Management Blog, Aug. 18, 2022, 6 pgs, (dowloaded Jun. 26, 2023 from https://iamworld.co.uk/wp/2022/08/18/trust-vs-authority-in-access-recovery-procedures/).

* cited by examiner

*Primary Examiner* — Benjamin A Kaplan

(57) ABSTRACT

The technology disclosed teaches systems, methods, and media for enabling a user to recover from a loss of one or more authentication factors that are required in order to access a service. A pre-registered helper user is able to participate in the authentication journey on behalf of the user and provide an identity validation of the user in order to successfully authenticate the user in order for an authentication journey server to grant the user access to the service. The technology disclosed further teaches systems, methods, and media obtaining secondary approval for a request to initiate a restricted action during a first active session between a user and a service. A pre-registered supervisor user is able to participate in the authentication journey on behalf of the user and provide a secondary approval for the request in order for an authentication journey server to grant the user access to the service.

25 Claims, 9 Drawing Sheets

PEER RECOVERY PROCEDURES FOR ACCESS RECOVERY AND ACCESS CONTROL

PRIORITY APPLICATION

This application claims the benefit of and priority to U.S. Provisional Patent Application No. 63/535,537, titled "Peer Recovery Procedures For Access Recovery and Access Control," filed 30 Aug. 2023, which is hereby incorporated by reference for all purposes.

RELATED APPLICATIONS

This application is related to the following commonly owned applications:
- U.S. patent application Ser. No. 17/673,692, titled "Authentication And Access Management For Heterogeneous Sources Of Anomaly Detection Data," filed on 16 Feb. 2022 which claims the benefit of U.S. Provisional Application No. 63/150,042, filed 16 Feb. 2021; and
- U.S. patent application Ser. No. 17/696,739, titled "Console-Based No-Code/Low-Code Theme Management For Authentication Journeys," filed on 16 Mar. 2022; and
- U.S. patent application Ser. No. 17/956,740, titled "App Free Authentication Across Channels," filed on 29 Sep. 2022; and
- U.S. patent application Ser. No. 17/958,208, titled "Runtime Configuration of Authentication Journeys," filed on 30 Sep. 2022; and
- U.S. Provisional Application No. 63/443,337, titled "Intercepting Worthless Requests at the Network Edge Using Machine Learning," filed on 3 Feb. 2023.

These forgoing related applications are hereby incorporated by reference for all purposes.

TECHNICAL FIELD

The technical field relates to computer security and leveraging peer assistance in user authentication or access approval for restricted actions. More specifically, the technology disclosed relates to enabling authentication helpers to assist a user in a recovery procedure following the loss of one more authentication factors and also relates to enabling access helpers to approve user requests for access to a restricted action.

INCORPORATIONS

The following materials are incorporated by reference for all purposes as if fully set forth herein:

"Trust vs Authority in Access Recovery Procedures" by Marcin Zimny, 18 Aug. 2022; https://iamworld.co.uk/wp/2022/8/18/trust-vs-authority-in-access-recovery-procedures/.

BACKGROUND

Digital identity and access management (IAM) flows involve user authentication journeys in which the user provides one or more authentication factors to establish their identity to a server in order to access a digital resource. Given that the user has been authorized to access the resource and authentication is successful, the user is granted access to the digital resource by the server. Multi-factor authentication is increasingly relied on for security. Inevitably, there exists a risk that the user will lose or forget one or more authentication factors required by the server in order to successfully authenticate the user. Common examples of this include forgotten passwords or security question answers as well as loss of a physical device storing an authentication factor (e.g., a mobile device storing an authentication application that, when accessed by the user, provides a one-time-use code).

Once a user is no longer able to access an authentication factor, remedial actions for access recovery often involve either an authority-based procedure or a self-service procedure. Authority-based procedures include requesting a recovery procedure or authentication factor reset from an administrator, call center, IT help desk, and so on. Access recovery services from an IT help desk are a costly expense for enterprises and can take up considerable amounts of the user's time, delaying access. Self-service procedures include recovery procedures that may be initiated and managed by the user, such as requesting a password reset link or providing an additional authentication factor in order to reset the forgotten authentication factor. Most commonly, self-service procedures leverage the user's email. However, this is only helpful if the user has access to the email (e.g., is an active email to which the user knows the password. Neither authority-based or self-service procedures provide timely solutions for users when the lost authentication factor is a possession factor, such as a physical keystore, ID badge, or mobile device.

An opportunity arises to enable access recovery procedures that are cost- and time-efficient, streamlined, and secure. Accordingly, an opportunity arises to augment access management flows to leverage peer trust relationships in access management processes.

DETAILED DESCRIPTION

Figure 1:
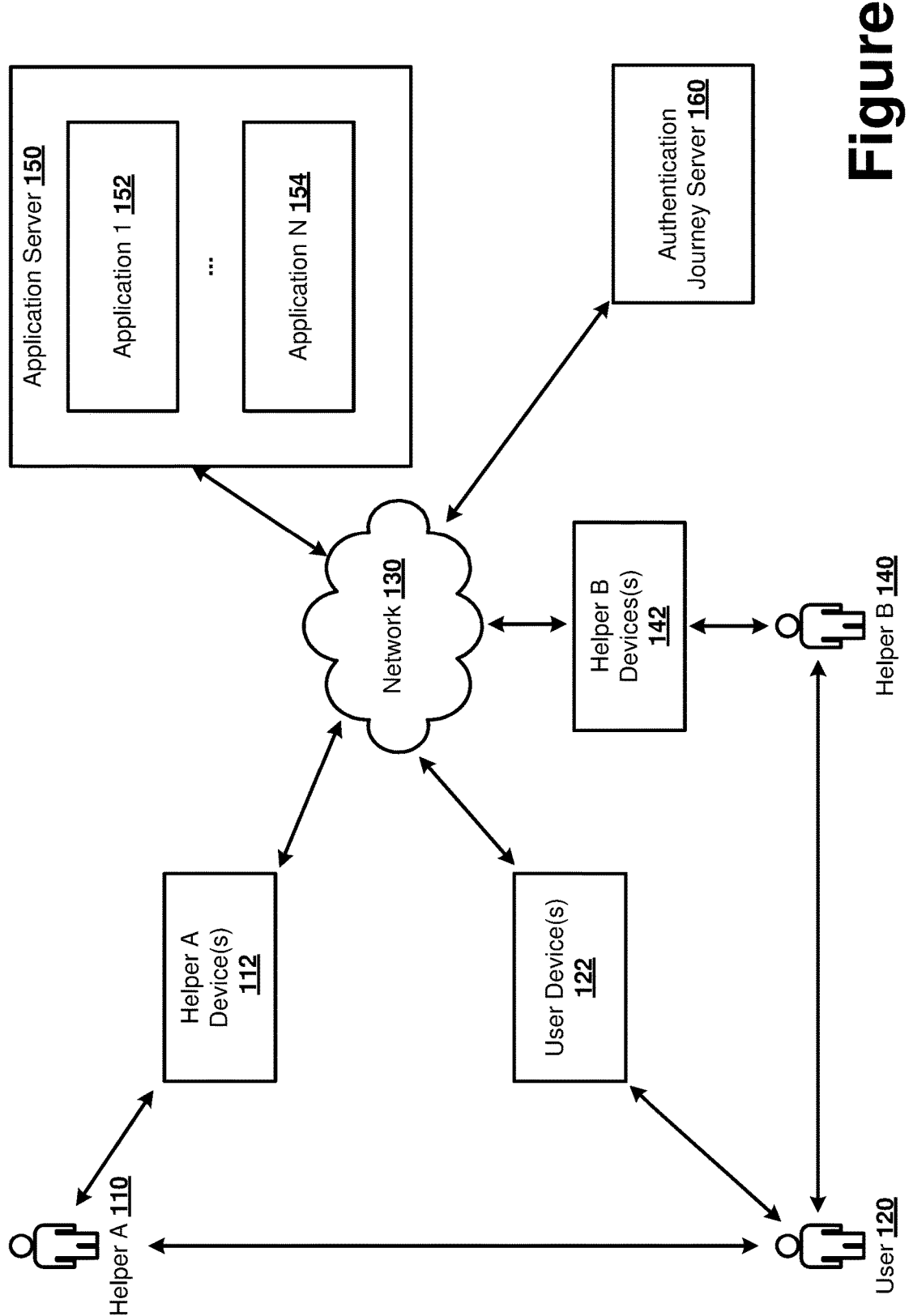
FIG. 1 illustrates an example architecture of a system configured for peer trust-based recovery procedures involving multiple users during an authentication journey, according to one implementation of the disclosed technology.

The following detailed description is made with reference to the figures. Example implementations are described to illustrate the technology disclosed, not to limit its scope, which is defined by the claims. Those of ordinary skill in the art will recognize a variety of equivalent variations on the description that follows.

The technology disclosed features authentication helpers. An authentication helper is a person other than the user who has pre-registered to be part of an authentication journey. In a work environment, colleagues within an organization structure can be automatically registered as helpers. More generally, a user can recruit a helper to pre-register.

Authentication helpers are useful in at least two scenarios. Sometimes, a user who was enrolled for multi-factor authentication loses or forgets one or more of the factors. A helper can substitute for enlisting a System Administrator to overcome the lost factor(s). In addition, there are some users, such as minor children and elderly parents, who would benefit from a helper approving their actions under certain circumstances. These scenarios can be addressed by an identity and authentication management or other system using the technology disclosed.

Consider the lost authentication factor scenario. For instance, a user loses their cell phone authentication factor, used either for receiving authentication codes by SMS or for generating an authentication code from an app, or forgets their password. They face tracking down their System Administrator, explaining what they've lost, and waiting for the System Administrator to devise a workaround. The technology disclosed allows them to turn to a pre-registered helper instead of the System Administrator.

In one recovery process, the user initiates an authentication recovery journey. The user authenticates themselves using one factor and identifies the helper. The authentication server pushes a link to the helper or waits for the helper to initiate access. The helper leverages their pre-registration, authenticates themselves, and verifies that they are helping the user. Optionally, the authentication server can query to verify that the helper received a reliable request for help from the user. The helper participation in the authentication journey serves as the second authentication factor. The factor relied on by the user to begin the authentication recovery journey coupled with the helper's participation satisfies the two-factor authentication requirement. The authentication journey is completed, and the authentication server approves access by the user.

In another recovery process, the user initiates a video call with their helper and asked the helper an authentication recovery journey. The video call, apart from the technology disclosed, assures the helper that the user's request is not a deep fake. The helper leverages their pre-registration when contacting the authentication server to authenticate themselves as a helper and to identify the user as requiring help. Optionally, the authentication server can verify that's the helper has received the reliable request from the user. The helper-initiation of the authentication journey serves as one authentication factor. The authentication server pushes a link to the user or waits for the user to initiate access. One factor is still in possession of the user is coupled with the helpers second factor of authentication. The authentication journey is completed, and the authentication server approves access by the user.

An authentication recovery journey can, of course, be accompanied by a journey branch that establishes a new authentication factor for the user.

With two pre-registered helpers, the technology disclosed can be used to overcome loss of both authentication factors by the user. Preferably, the user enlists the two helpers independently and they are unaware of each other, which reduces the possibility of them taking over the user account without the user asking for help. Having two independent helpers is more a matter of discipline than an implementation of technology, though the technology disclose can require that the one helper not belong to the same organization as the user and the other helper, when the user and other helper are pre-registered based on their organization affiliation. When both authentication factors have been lost, the user reliably requests one helper to initiate the authentication journey and to identify the user as needing help. The user requests the second helper to join the authentication recovery journey and provide the second authentication factor to the authentication journey server. The server then pushes a recovery process to the user, following authentication of both pre-registered helpers.

The technology disclosed is not limited to two factor authentication. It can be applied to authentication using three or more factors. If the user has lost one of three or more factors, they can recover with the assistance of one helper. If the user has lost two factors, two recovery helpers will be needed. If the user loses three factors, three helpers may be required, etc. When security requires three factor authentication, rules may be established and enforced by the authentication journey server that require one of the helpers to be a supervisor or manager of the user or a Technical Support authority within the user's organization.

The second scenario introduced above is approval of restricted actions by users who need or desire supervision. Minor children who are using a parent's credit card may need supervision, either to satisfy their parent or the credit card issuer. Elderly parents who are susceptible to telemarketing may desire or need supervision. The technology disclosed affords time-limited supervision. Either the user or the authentication server can enlist the helper to approve a restricted action. In one approval process, the user reliably contacts the helper. The helper connects with the authentication journey server to approve the restricted action.

In another approval process, the authentication journey server identifies an action that the user is attempting to take as a restricted action and pushes an approval request to the helper. When telemarketing or any other off-line restricted action is involved, as opposed to an online purchase, the authentication journey server may notify the user that approval has been requested and require acknowledgement by the user. In both supervisory approval processes, approval from the helper is time-limited and needs to be received within a predetermined time or while the user is still engaged in the session in which they are attempting to take the restricted action. Both approval processes can be enhanced by coordination between the user and the helper, for instance by a video or phone call or even face-to-face. Coordination and time-limited approval enhance the supervisory benefit of the technology disclosed.

A system and methods for the technology disclosed are described below. First, certain terminology and concepts will be introduced to complement later-described aspects of the technology disclosed. Next, a system for the technology disclosed is described, in accordance with one implementation of the technology disclosed. The description continues to expand upon this system with variations to the system and selected example implementations of the technology disclosed.

Terminology

The technology disclosed provides systems and methods for enabling a user to recover from a loss of an authentication factor required by a multi-factor authentication journey to access a service. The technology disclosed also provides systems and methods for obtaining secondary approval for a request to initiate a restricted action during a first active session between a user and a service. The following discussion within this section provides definitions, examples, or context for selected terminology that is used with reference to the figures later in the description.

The multi-factor authentication journeys and access requests disclosed herein generally relate to identity and access management procedures. Identity and access management, at a high-level, involves some or all of the following operations: (i) the registration of users within a registry associated with a particular service, (ii) provisioning credentials to the registered users, (iii) authorizing users to access and/or perform certain actions, (iv) authenticating the identity of users requesting to access the service (or a particular action within the service), and (v) enforcing access control to grant access to authorized users and denying access to unauthorized users.

The term "service" is used herein to describe a variety of resources such as servers, digital assets (e.g., digital endpoints, software, files, data, and other digital items with associated access permissions for use), hardware (e.g., building card access systems, machinery, etc.) and computer devices (e.g., mobile phones, personal computers, tablets, etc.). During the registration and provisioning of a user account (i.e., initialization of the user account), one or more authentication factors can be enrolled for the user. The registry of user accounts can be, for example, an identity and access management database that contains the associated data for registered user accounts, their identification attributes and access permissions, and a relationship hierarchy relating user accounts to one another within the context of an enterprise's organizational structure. For example, a first registered user account, identified as the supervisor of a department with a high level of access permissions, can be connected to a second registered user account, identified as an employee within the same department and a lesser level of access permissions, such that the first and second registered users have a defined supervisor/direct report relationship. Accordingly, accounts can be connected through a number of other relationships, such as colleagues within the same team, and other accounts may not be directly related.

Authentication—identity validation of one entity to another—includes an identity holder (i.e., the user seeking authentication) seeking to authenticate their identity to an identity verifier (i.e., a server, network, or a component thereof) via presentation of one or more authentication factors. In the context of the implementations described to illustrate the technology disclosed, an authentication server facilitates the authentication of a user requesting access to a service. Herein, the authentication server may be referred to synonymously as an authentication journey server. Authentication factors may be classified as knowledge factors, possession factors, or inherence factors. Knowledge factors are based on information that (ideally) only the user knows such as a password, passcode, personal identification number, security question answers, and so on. Possession factors are based on something the user has in their possession, such as a physical keystore, a USB drive, an identification badge, or a mobile device storing an authentication factor and/or authenticator application that generates ephemeral authentication factors (i.e., one-time-use codes). Inherence factors are based on the user's body, such as a face or fingerprint.

Knowledge factors are used for user authentication in a broad range of applications given their ease of use for users with little-to-no technological expertise. However, knowledge factors are also easily lost—particularly when the user has enrolled a knowledge factor that is complex (e.g., a password with stringent requirements for a certain type and number of characters compared to a password with fewer requirements), very old (e.g., a security question that was answered over a year ago), or very new (e.g., a user very recently reset their password but only recalls the previous password). Possession factors can similarly be lost, forgotten, broken, or otherwise not accessible to the user. While inherence factors have minimal reliance on the user's behavior, there is still a risk of technical failures preventing the user from authenticating with their inherence factor(s) in certain scenarios (e.g., Face-ID failing to recognize a user while wearing glasses or a mask). Thus, an identity and access management system must rely on some form of access recovery system in order to prevent users from becoming locked out of their accounts.

Identity and access management operations can be thought of as occurring in two phases—(1) initialization of the user account, including the definition of a user identifier, various user attributes and access permissions, and enrollment of authentication factors, and (2) operational use of the user account, including the facilitation of user authentication and access control. Implementations of the technology disclosed involve the operational use of a user account for a registered user for a service. Many of the example implementations of the technology disclosed involve a user requesting access to a service from the authentication server. The authentication and access control processes facilitated by the authentication server are referred to as "authentication journeys". A journey, as used in this document, is an end-to-end workflow, also referred to as an authentication tree and as a directed graph, invoked by an end user or device. Common journeys are account registration and sign-in, for example. The authentication journey can include operations such as those within the following workflow: a user transmits a request to authenticate in order to access a service; an authentication server evaluates the one or more authentication factor(s) provided by the user; the authentication server approves the user's access request given that the user (i) authenticates successfully and (ii) has been authorized to access the service or the particular action within the service they are seeking to access.

If a user is seeking authentication to access a service but has lost one or more authentication factors, a recovery procedure is necessary to re-establish the user's access to the service. If the user is unable to quickly re-establish access on their own, such as accessing a password reset link via email, the user must seek an authority-based recovery procedure to obtain administrative assistance. The feasibility of these types of recovery procedures is situationally dependent. If the user needs to generate a ticket with an IT provider or a request to a supervisor in order to enroll a new authentication factor, this will delay the user's access to the resource until such a recovery procedure can be performed. If the user has lost access to a physical authentication device, an email account, a recovery code, an authenticator app, etc., this may delay the process even further. During this delay, the user is unable to access the resource and may be limited in productivity for that time period.

The technology disclosed relates to an alternative method of access recovery that leverages peer trust for authentication journeys. The concepts underlying authentication are inherently tied to identity validation. Consider a scenario in which a first user is unable to validate their identity during authentication due to the loss of an authentication factor. The first user is associated with a second user who is familiar with the first user's identity, such as a manager who has a trust relationship with a member of their team such that they can recognize and vouch for that team member. If the second user is registered with the service and can successfully authenticate (i.e., the authentication server trusts the second user), and the second user can validate the identity of the first user (i.e., the second user trusts the first user), the server can be configured to trust the first user given the identity validation provided by the second user. These trust relationships are described at length within Zimny's "Trust vs. Authority in Access Recovery Procedures", the contents of which are incorporated by reference in entirety.

The above-described peer-trust dynamic is described at length with reference to the figures. Within the disclosed implementations, the first user in the above scenario is described as a user who is seeking authentication in order to access a resource. The first user has been previously registered with the service. At some previous point in time, the second user has been registered as a "helper user" for the first user, allowing the second user to provide identity validation on behalf of the first user in the event that the first user has lost an authentication factor and cannot validate their own identity. If the user requests authentication and cannot authenticate independently, a recovery procedure (alternatively referred to as a peer recovery procedure, helper recovery procedure, or access recovery procedure) can be initiated by the user or the user's helper. Following a request to initiate a recovery procedure, a "help me flag" is set within the authentication journey, re-directing the journey from a standard single-user authentication journey to the recovery procedure involving helper-mediated authentication. This flag can for instance be a variable in software, such as a bit flag, or implied in selection of a logic branch, such as through an authentication tree. The helper can authenticate themselves and validate the identity of the user in place of the missing authentication factor, at which point the user can be approved to access the resource and/or enroll a new authentication factor for future authentication requests. Variations of this workflow are described with reference to FIGS. 3A-7.

The augmentation of authentication journeys with a helper user may be extended beyond user authentication operations. In some use cases, the participation of a helper is advantageous for access control purposes. Some implementations of the technology disclosed involve the user successfully authenticating and requesting access to an action that has been restricted for their account, requiring secondary access approval from a second helper user called a supervisor. One potential approach for this scenario is an asynchronous access control process, in which the user initiates an authentication journey during an active session with the authentication service, followed by the authentication journey then being suspended for a period of time and the user ceasing to engage with the active session until the supervisor approves the access request via a separate process. In contrast, the disclosed access control approach enables "real time" authentication and access control for the user. The approach can be thought of as occurring in real time because, after requesting to initiate the restricted action, the user remains actively engaged in the active session and the authentication service remains active while a second active session is invoked between the supervisor and the authentication service. The supervisor provides approval for the user's request, and the authentication server can grant access. Analogous to the previous authentication implementation, in which the user does not experience a significant delay (e.g., over an hour, multiple hours, a day, or multiple days later) between their authentication request and successful authentication, the restricted action implementation similarly prevents a significant delay between the user's access request and successfully obtaining access. Likewise, this restricted action implementation also involves an authentication journey. Instead of the help me flag being set in response to the user requesting authentication, the help me flag is set in response to the subsequent access control request. After the help me flag, the authentication journey diverts from the simple one-user workflow into a two-user workflow in which the interaction switches over to a second user (i.e., the supervisor) in order to receive an approval for a restricted action, then switches back to the first user in order to complete or otherwise provide access to the requested action. This scenario is described in further detail with reference to FIG. 7.

A user skilled in the art will recognize that many variations of the above-described technology exist, and the disclosed implementations herein may comprise a range of architectural and ensemble structures without deviating from the scope or spirit of the technology. The mention of certain terminology or implementations of said terminology alone should not be understood to imply universal or limiting aspects of the technology disclosed; rather, merely as introductory concepts to build upon later in the description.

Now, the discussion turns to a description of the disclosed system and methods in further detail.

System Overview

FIG. 1 illustrates an example architecture of a system 100 configured for peer trust-based recovery procedures involving multiple users during an authentication journey, according to one implementation of the disclosed technology. Because FIG. 1 is an architectural diagram, certain details are intentionally omitted to improve the clarity of the description. The discussion of FIG. 1 is organized as follows. First, the elements of the figure are described, followed by their interconnections. Then, the use of elements in the system is described in greater detail.

System 100 includes application server 150, on which a first application 152 through an $N^{th}$ application 154 operate, authentication journey server 160, a user 120, Helper A 110, and Helper B 140. System 100 also has network 130 which can be a public network or a private network, in different implementations. System 100 can include multiple applications and multiple networks. User 120, Helper A 110, and Helper B 140 interact with network 130 via respective client devices 112, 122, and 142.

User 120 may authenticate their identities (facilitated by authentication journey server 160) to access a service on application server 150 via user device(s) 122. User device(s) 122 can each be a computer, tablet, cell phone, smart watch, and so on. In some implementations, user 120 may only be able to access services on application server 150 via certain devices, but not others, within user devices 122. In other implementations, user 120 can only access services on application server 150 via a single user device 122. The same principle follows for Helper A 110 using Helper A device(s) 112 and Helper B 140 using Helper B device(s) 142. User 120 has a relationship with Helper A 110 and another relationship with Helper B 140. Each respective relationship between a helper and user 120 is defined by a level of trust such that the helper can recognize and validate user 120 via their face, voice, or other inherence factors belonging to user 120 (e.g., if user 120 connected to Helper A 110 via a video call and requested that Helper A 110 validate their identity, Helper A 110 is familiar enough with user 120 to recognize that user 120 is not an impersonator).

These trust relationships can be leveraged within an authentication journey such that an authentication factor for user 120, if not available, can be replaced with an identity validation from either Helper A 110 or Helper B 140. If user 120 does not have access to two authentication factors, identity validation from both Helper A 110 and Helper B 140 can be substituted. In some implementations, Helper A 110 and Helper B 140 do not have an established relationship or channel of communication with one another, thereby decreasing the risk of conspiring to obtain malicious access to the account of user 120. This may be achieved by concealing the identity of Helper A 110 and Helper B 140 from one another so that they are not aware of who is providing the second identity validation. Alternatively, this may be achieved by preventing two helpers being selected from the same department within an organization. Although system 100 only includes Helper A 110 and Helper B 140, other implementations of the technology disclosed include more than two helpers and the number of helpers is limited only by the number of authentication factors required by authentication journey server 160.

In the interconnection of the elements of system 100, network 130 couples devices 112, 122, and 142 with the disclosed technology components authentication journey server 160 and N applications 152 through 154 operating on application server 150. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Authentication journey server 160 facilitates user authentication via workflows called authentication journeys. If user 120 is unable to authenticate themselves during an authentication journey due to loss of one or more authentication factors, a recovery procedure can be initiated within the authentication journey. The recovery procedure involves identity validation on behalf of user 120 from Helper A 110 and/or Helper B 140. The discussion now turns to the authentication journey and recovery procedure operations in further detail.

Peer Trust-Based Recovery Procedures

Figure 2:
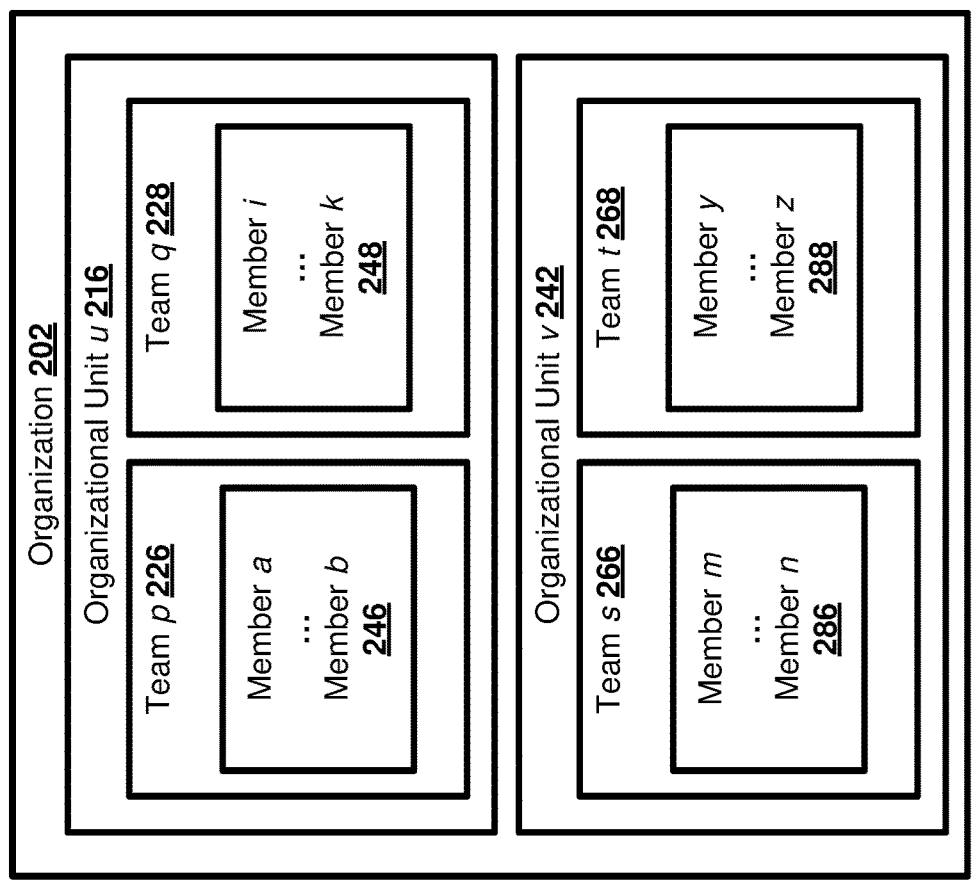
FIG. 2 illustrates a high level block diagram of an organizational structure for an enterprise.
Figure 2:
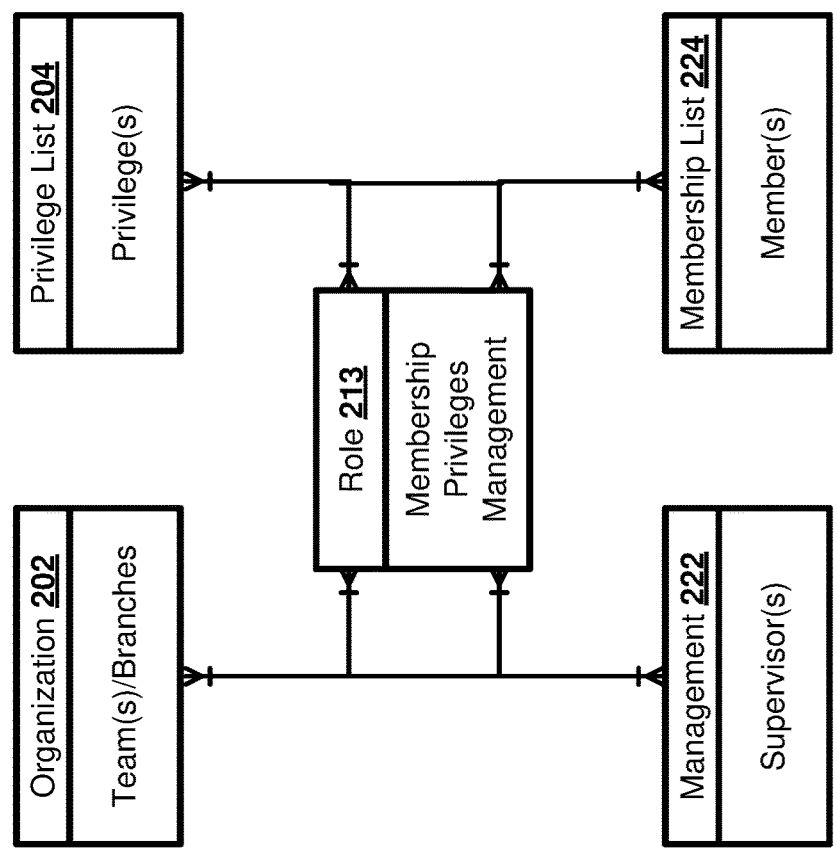

FIG. 2 illustrates a high-level block diagram 200 of an organizational structure for an enterprise. Diagram 200 comprises an entity-relationship schematic for a role 213 within an organization 202, as well as a schematic representing an example hierarchical structure for organization 202. The entity-relationship schematic illustrates the relationship between a role 213 and the organizational structure of organization 202, management chains 222, and the privileges and membership features associated with the role 213. The membership list 224 refers to the users who are assigned to a particular role and privilege list 204 refers to the access permissions a user receives upon assignment to a particular role.

The components of diagram 200 may be dimensions of an identity and access management (IAM) database for an enterprise. The IAM database can be leveraged for delegation, revocation, and supervision of provisioning for user access to databases, files structures and other computing resources. Administrators assign roles with associated privileges to users. The privileges govern access to data elements and process controls found in databases, file structures and other secure processes.

Accordingly, each role 213 within organization 202 has associated attributes describing the role's membership, privileges, and management relationships. The organization 202 can be structured by a number of teams, or branches within a hierarchy. Each branch is managed by at least one supervisor, and there may be multiple levels of supervision within a branch. Furthermore, a supervisor within one branch may report to a supervisor within an upstream branch in the hierarchy. Role 213 can be associated with a list of privileges 204, wherein a privilege is a unit of access rights that can be course-grained (i.e., authorization to access a group of related resources) or fine-grained (i.e., authorization to access a specific resource). Role 213 can be associated with a membership list 224, the members of which are other individuals within the organization 202 that share the same role. Role 213 has a "many-to-many" relationship with the organization 202, privilege list 204, management 222, and membership list 224. In other words, many roles can be associated with an organization and vice-versa, many supervisors can be associated with a role and vice-versa, and so on. Moreover, organization 202 has a many-to-many relationship with management 222, and privilege list 204 has a many-to-many relationship with membership list 224.

The relationship between various roles and branches of organization 202 can be divided into a hierarchical structure. For example, organization 202 may include a number of organizational units such as organizational unit u 216 and organizational unit v 242. Organizational units u 216 and v 242 further include a number of teams, or branches, such as team p 226, team q 228, team s 266, and team t 268. Each team 226, 228, 266, 268 further contains a membership list 246, 248, 286, and 288. Relationships between members of the organization can be defined by each of the components within diagram 200. For example, members can be related by belonging to the same team, having the same role, reporting to the same supervisor, having the same privileges, belonging to the same organizational unit, etc.

This data can be useful in determining appropriate trust relationships when establishing helper users for a particular user in a recover journey. In one aspect, an IAM database can be used to identify users with relationships that are appropriate for a helper dynamic (i.e., a pair of users who interact in a capacity such that they could reliably validate one another's identities). In another aspect, an IAM database can be used to identify users with relationships that are inappropriate for sharing helper status to the same user. For example, if users A, B, and C work on the same team and report to the same supervisor, and user A is a helper for user B, user C cannot also be a helper for user B. In another example, user A is a helper for user B; thus, user B is unable to be registered as a helper for user A to prevent complications in the event that both user A and user B need to initiate a recovery procedure.

Figures 3A, 3B:
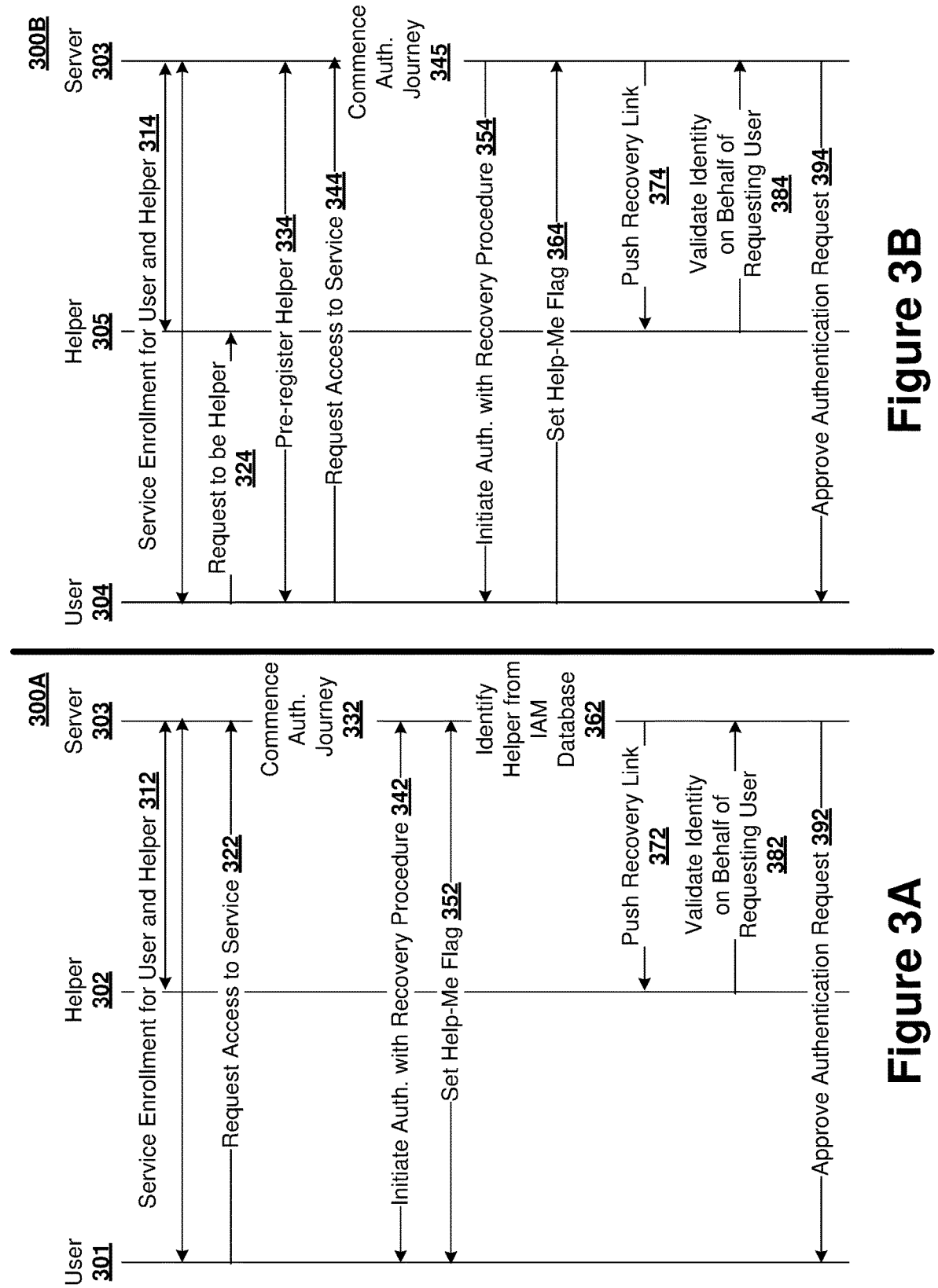
FIG. 3A is a message flow diagram for a peer recovery procedure involving a user requesting authentication and a helper with an inherent relationship to the user identified from an identity and access management database.
FIG. 3B is a message flow diagram for a peer recovery procedure involving a user requesting authentication and a helper with a voluntary relationship to the user agreed upon between the helper and the user.

FIG. 3A describes a workflow in which an IAM database is used to identify inherent relationships between users and automatically establish helper relationships between registered users. These relationships may be identified by any combination of one or more components described within FIG. 2, and a user skilled within the art will recognize the similar components that may also be considered for the purpose of identifying relationships in an enterprise or an organization within an enterprise.

FIG. 3A is a message flow diagram 300A for a peer recovery procedure involving a user 301 requesting authentication and a helper 302 with an inherent relationship to the user identified from an identity and access management database. Diagram 300A comprises a user 301, helper 302, and server 303. User 301 and helper 302 belong to a shared organization within their enterprise that utilizes an IAM database for access control. Server 303 is an authentication journey server associated with one or more services available to user 301 and helper 302.

In operation 312, both user 301 and helper 302 (who have previously been registered within the organization and issued credentials) are enrolled for the service. During operation 312, user 301 enrolls a number of authentication factors that can be used for authentication of user 301 facilitated by server 303 in future access requests. Accordingly, helper 302 undergoes the same enrollment process. At a point in time following operation 312, user 301 requests access to a service in operation 322. By requesting access to the service, user 301 is also initiating an authentication journey with server 303.

Consequently, server 303 commences the authentication journey in operation 332 and requires user 301 to input the required authentication factor(s) to authenticate their identity prior to proceeding to the access control stage. However, within the scenario represented in diagram 300A, user 301 has lost access to an authentication factor; hence, user 301 is unable to independently authenticate their identity. In operation 342, authentication proceeds with a recovery procedure in order to enable user 301 to regain access to the service. As a result of the recovery procedure being initiated in operation 342, a help-me flag is set in operation 352. The help-me flag of operation 352 adjusts the path of the authentication journey to no longer request the lost authentication factor from user 301, and instead, request an identity validation from a second helper user on behalf of the user after the helper authenticates their own identity. In operation 362, the server 303 identifies a helper from the organization's IAM database in dependence on the relationships of user 301 inherent to their role, membership, team, or another attribute of the user 301 as described in diagram 200. Helper 302 is identified on behalf of user 301, therefore server 303 pushes a recovery link to helper 302 in operation 372. The recovery link may be sent, for example, to the email address or secure messaging account of helper 302 with a request to help user 301 in their recovery procedure. The recovery link directs helper 302 to authenticate their own identity, then validate the identity on behalf of user 301 in operation 382. Once the identity validation is received by the server 303, user 301 receives an approval for their authentication request in operation 392 and may subsequently be directed towards a service they wish to access.

In one implementation of the technology disclosed, operation 362 (identification of a helper from the IAM database) occurs at a point in time before the authentication request so that both the user 301 and the helper 302 are prepared for the recovery procedure. In another implementation, the IAM database is used to identify appropriate potential helpers for user 301 and user 301 is able to choose a helper from the list of appropriate helpers. If chosen, helper 302 may be required to review the request and confirm their role as a helper for user 301. In yet another implementation, the user 301 may have the option to pre-select a helper, but in the event that a user 301 has not previously selected a helper, server 303 is able to automatically select a helper using the IAM database or accept a user's immediate selection of a colleague helper. In many implementations of the technology disclosed, the user 301 will directly reach out to helper 302 prior to operation 382 (the helper 302 uses the recovery link to validate the identity of user 301) to inform helper 302 of their need to initiate a recovery procedure, request their assistance, and verify their availability. In other implementations, the helper 302 receives the recovery link in operation 372 and reaches out to the user 301 to confirm that the request came from user 301. The form of contact between user 301 and helper 302, regardless of who initiates it, may occur via an in-person conversation, phone call, video call, et cetera. A wide range of communication methods are available, but an in-person conversation or video call provide the highest level of certainty because of the difficulty associated with impersonation in these scenarios. The message exchange could include verification from the helper that the helper has had a reliable interaction with the user that is considered to minimize the likelihood of a deep fake, such as an in-person or video conference interaction.

In other implementations of the technology disclosed, an IAM database may not be available and/or is not the best fit option for a use case. For example, the service may be a mobile device application, such as a financial institution user portal, rather than an enterprise. In another example, a user may prefer the option of selecting a helper from outside of the organization such as a spouse or trusted friend. Moreover, a service may choose to not rely on an IAM database even if one is available, choosing to allow the user to decide their helpers based on their own knowledge of their relationships and levels of trust. FIG. 3B describes a process of a helper assisting a user with a recovery procedure where the helper relationship is a voluntary relationship rather than an inherent one based on organizational structure.

FIG. 3B is a message flow diagram 300B for a peer recovery procedure involving a user 304 requesting authentication and a helper 305 with a voluntary relationship to the user agreed upon between the helper and the user. Diagram 300B comprises a user 304, helper 305, and server 303. User 304 and helper 305 have a voluntarily established trust relationship.

In operation 314, both user 304 and helper 305 are enrolled for the service. During operation 314, user 304 enrolls a number of authentication factors that can be used for authentication of user 304 facilitated by server 303 in future access requests. Accordingly, helper 305 undergoes the same enrollment process. User 304 directly contacts helper 305 in operation 324 and asks to establish a helper relationship. Helper 305 agrees, and both user 304 and helper 305 confirm the relationship within a pre-registration process in operation 334.

At a point in time following operation 334, user 304 requests access to a service in operation 344. By requesting access to the service, user 304 is also initiating an authentication journey with server 303.

Consequently, server 303 commences the authentication journey in operation 345 and requires user 304 to input the required authentication factor(s) to authenticate their identity prior to proceeding to the access control stage. However, within the scenario represented in diagram 300B, user 304 has lost access to an authentication factor; hence, user 304 is unable to independently authenticate their identity. In operation 354, authentication proceeds with a recovery procedure in order to enable user 304 to regain access to the service. As a result of the recovery procedure being initiated in operation 354, a help-me flag is set in operation 364. The help-me flag 364 adjusts the path of the authentication journey to no longer request the lost authentication factor from user 304, and instead, request an identity validation from a second helper user on behalf of the user after the helper authenticates their own identity. In operation 374, server 303 pushes a recovery link to helper 305. The recovery link may be sent, for example, to the email address or secure messaging account of helper 305 with a request to help user 304 in their recovery procedure. The recovery link directs helper 305 to authenticate their own identity, then validate the identity on behalf of user 304 in operation 384. The message exchange could include verification from the helper that the helper has had a reliable interaction with the user that is considered to minimize the likelihood of a deep fake. Once the identity validation is received by the server 303, user 304 receives an approval for their authentication request in operation 394 and may subsequently be directed towards a service they wish to access.

Various implementations described above including different forms of communication between the user and helper with regard to diagram 300A similarly apply to user 304 and helper 305 in diagram 300B. Now, the discussion turns to the authentication journey workflow in further detail.

Figure 4:
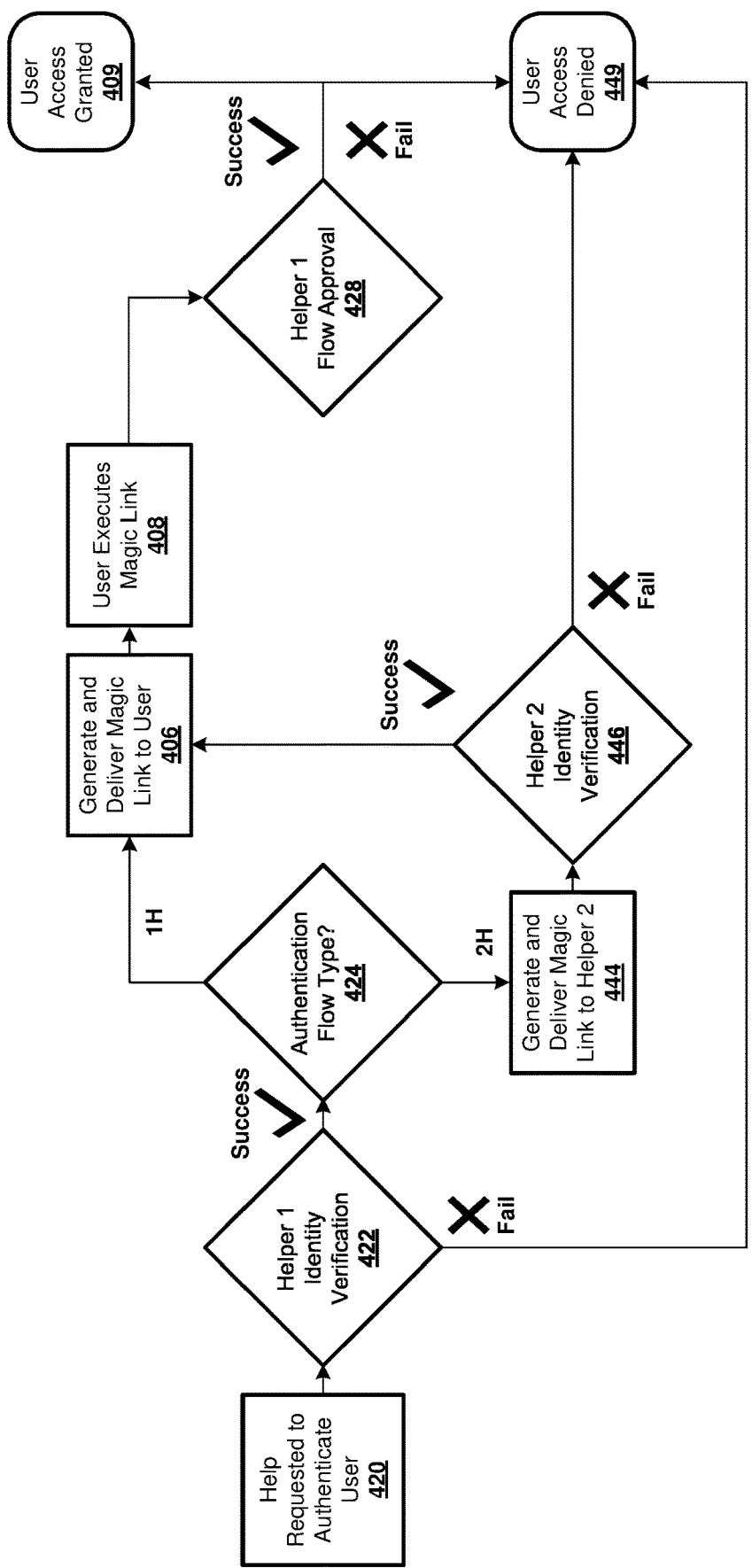
FIG. 4 is a schematic diagram illustrating an authentication journey involving a peer recovery procedure.

FIG. 4 is a schematic flow diagram illustrating a peer recovery procedure 400. Flow 400 represents one particular implementation of the technology disclosed. Flow 400 begins with a help request to initiate a peer recovery procedure in order to authenticate a user in operation 420. Operation 420 may further include the user reaching out to the first helper and requesting that the first helper initiates the peer recovery procedure on behalf of the user.

In an authentication flow (e.g., an authentication journey), authentication may begin with a user accessing a log-in page, prior to the illustrated flow, at which point the user is asked to authenticate their identity by providing their username and one or more required authentication factors (such as a password or one time use PIN) for the platform the user wants to access. If the user successfully authenticates themselves using their personal identifier (e.g., email or username) and the required authentication factor, the authentication server will provide access to the platform for the user.

However, the user may be unable to successfully complete the authentication journey for a range of reasons. In one example, the user has not provided the correct password and does not have access to their password, thus the authentication server will deny access to the platform for the user. The user, or more commonly, the helper on behalf of the user will need to initiate an authentication journey with a peer recovery procedure. Alternatively, if the authentication process fails for any reason (failure to authenticate with no recovery procedure options, unsupported input, no registered device for the user, client error, etc.), access can be denied by the authentication server and may also require a peer recovery procedure to be initiated in order for the user to access the platform.

The peer recovery flow 400 begins with operation 420, which includes the first helper initiating the peer recovery procedure on behalf of the user for the authentication journey, after the user has discovered an authentication factor has been lost and contacted the first helper for assistance. Next, in decision 422, the first helper is asked by the authentication server to provide an identity verification for the user. If the first helper cannot, or chooses not to, verify the identity of the user, the authentication journey will fail, and access is denied for the user in operation 449. The first helper may, for example, suspect a security risk in connection to the peer recovery help request, the user may inform the first helper that they no longer need help, or the authentication journey may reject the helper's identity verification if a security risk has been detected. The decisions within flow 400 (decisions 422, 424, 446, and 428) may be implemented with a timer such that the flow times out and proceeds directly to operation 449 (access denied) as a result of inactivity.

Once the first helper has successfully provided a first identity verification on behalf of the user in decision 422, flow 400 bifurcates at decision 424 based on the number of lost authentication factors to be replaced by peer recovery during the authentication journey. Flow 400 illustrates branches corresponding to one helper for one lost authentication factor (1H) or two helpers (2H); however, the operations of flow 400 may be expanded to accommodate any number of lost authentication factors via the inclusion of additional helpers. The 2H branch allow recovery by the user who has lost both required authentication factors such that two helpers are necessary in order to complete the authentication journey and peer recovery procedure. Separate helpers each providing separate identity verification in a one-to-one relationship with a lost authentication factor (i.e., the first helper provides the first identity verification in lieu of a first lost authentication factor, the second helper provides the second identity verification in lieu of a second authentication factor, and so on) increases the security of the peer recovery flow. However, alternative implementations may involve one helper providing a single identity verification in lieu of multiple lost authentication factors. Accordingly, other alternative implementations may involve multiple helpers each providing an identity verification in lieu of a single authentication factor as another approach to bolster security.

If the authentication journey is determined to be 1H in decision 424, flow 400 proceeds to operation 406 at which point a magic link is generated and delivered to the user. A "magic link" may be, for example, a one time use hyperlink sent to the user via email or SMS. A user skilled in the art will recognize the various approaches in which a magic link can be implemented within an authentication journey. Upon successful receipt of the magic link, the user may execute the magic link in operation 408, thereby enabling the user to be granted access to the platform in operation 409. In some implementations, the user may be automatically directed towards the platform upon executing the magic link in operation 408 as a result of the successful first identity verification in decision 422. In other implementations, the first helper is required to provide a final confirmation of the access in decision 428 once the user has accessed the magic link. If the first helper confirms the access, the user is granted access in operation 409. If the first helper fails to confirm the access, the user is denied access in operation 449. Alternatively, at 406, the platform could assert or set an authentication-factor-satisfied flag and have the user restart the authentication journey. The effect of the authentication-factor-satisfied flag on the authentication journey can be either to temporarily reduce the number of authentication factors or to facilitate provisioning of a replacement authentication factor. Then, the authentication journey flows through routine channels and the authentication-factor-satisfied flag is de-asserted.

Returning to decision 424, the discussion now turns to the 2H branch of flow 400. If the authentication journey has been determined to be 2H in decision 424, flow 400 proceeds to operation 444. In operation 444, a magic link is generated and delivered to a second helper. When more than one second helper is registered, provision needs to be made for determining which second helper to enlist. Preferably, the first helper is not given a choice, as lack of connection between the first and second helpers decreases any risk of scheming. One alternative is for the platform to randomly select among available second helpers, based on registration, online presence or both. Another alternative is to send links to all available second helpers, again based on registration, online presence or both. A third alternative is for the platform to provide a list to the user for selection. This level of detail is not shown in FIG. 4. The second helper, via the magic link, is directed towards an identity verification decision on behalf of the user, as shown in decision 446. If the second helper successfully provides a second identity verification on behalf of the user, the flow proceeds to operation 406, at which point the authentication journey follows operation 406, operation 408, and decision 428 as described above. If the second helper fails to successfully provide the second identity verification for the user in decision 446, the user is denied access in operation 449. When two or more helpers are involved, optional confirmation 428 can be provided by other than the first helper.

In some implementations of the technology disclosed, the user is directed, once access has been granted in operation 409, to reset the lost authentication factor and/or enroll a new authentication factor.

Figure 5A:
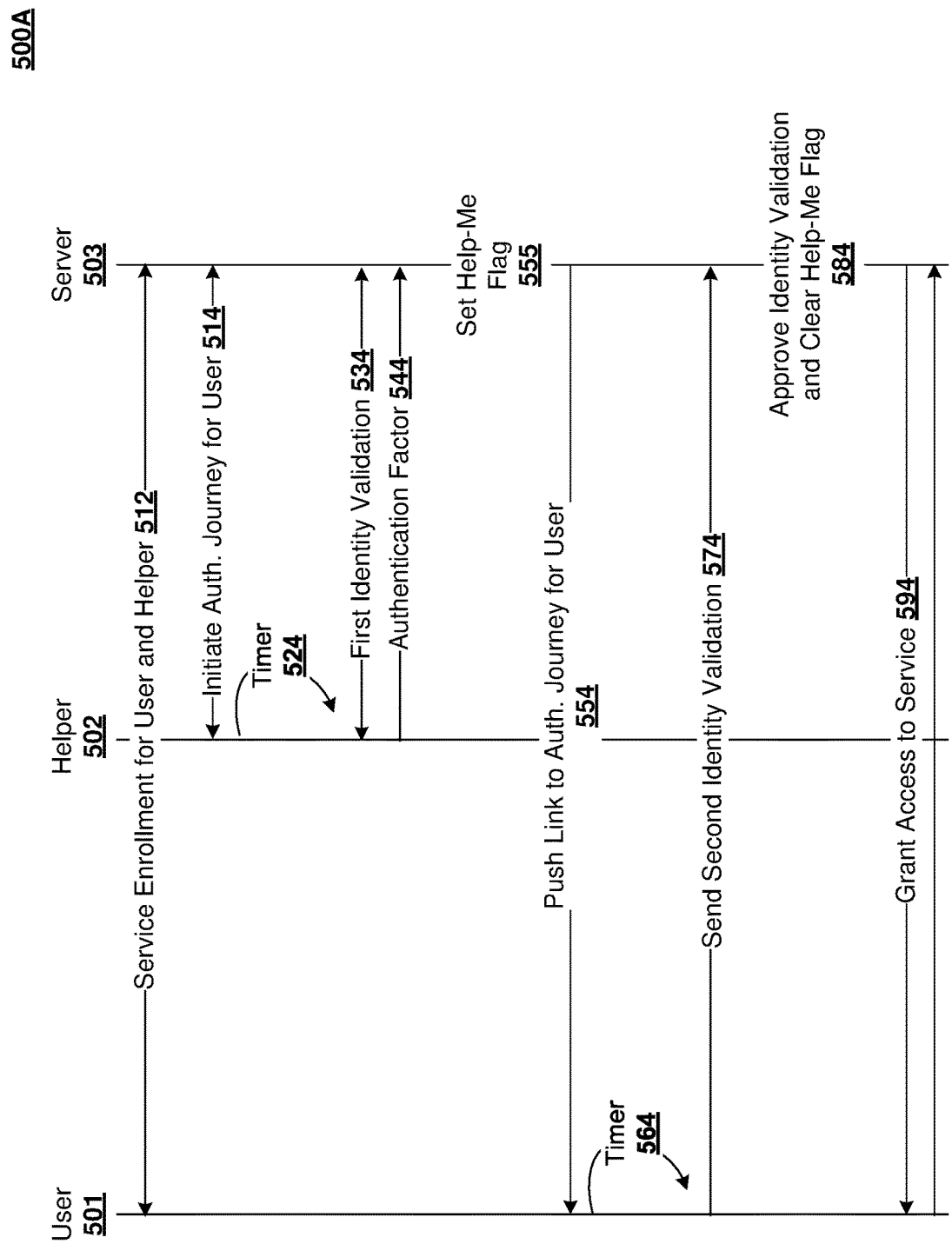
FIG. 5A is a message flow diagram for a peer recovery procedure initiated by a helper on behalf of a user requesting authentication.
Figure 5B:
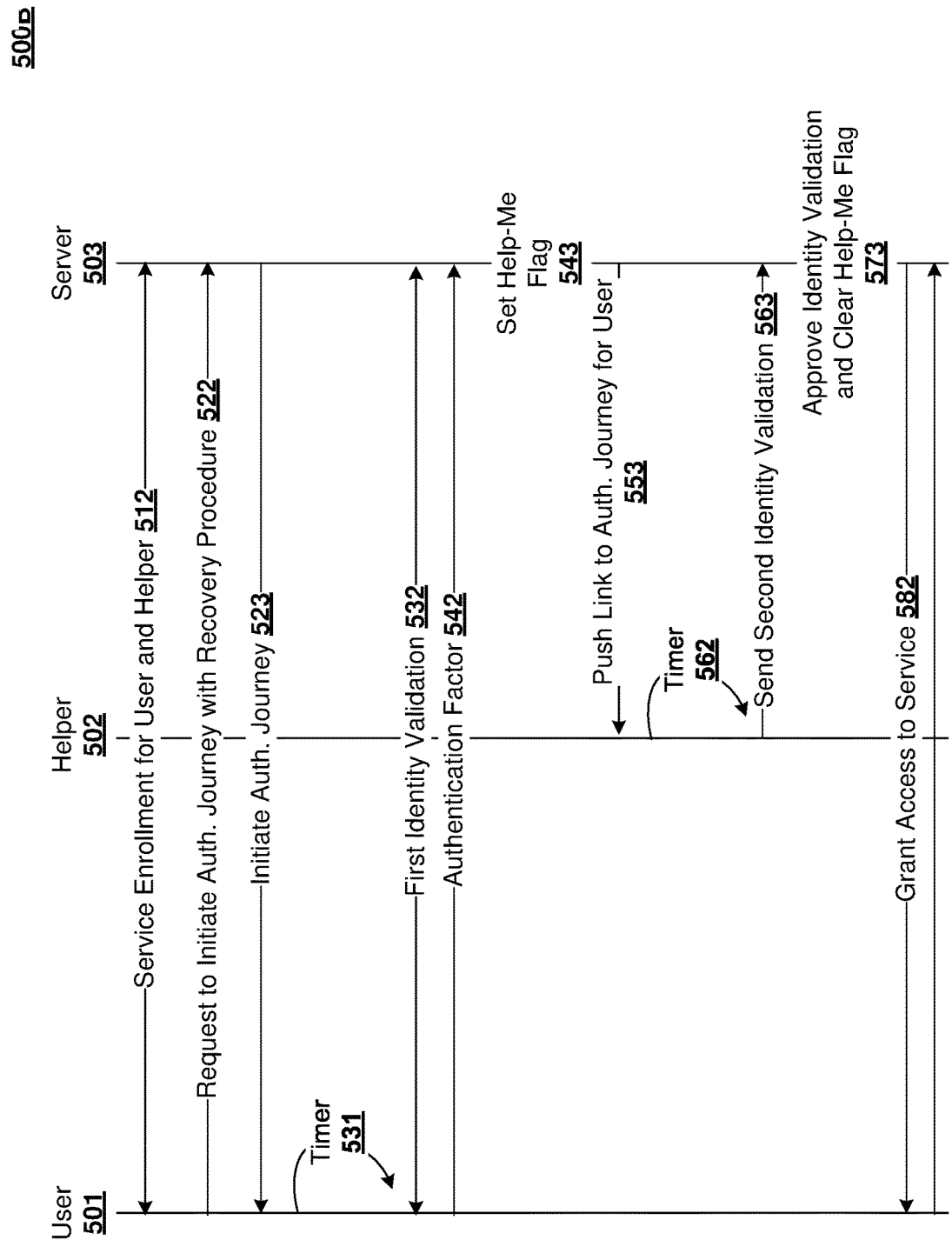
FIG. 5B is a message flow diagram for a peer recovery procedure initiated by a user requesting authentication.
Figure 6:
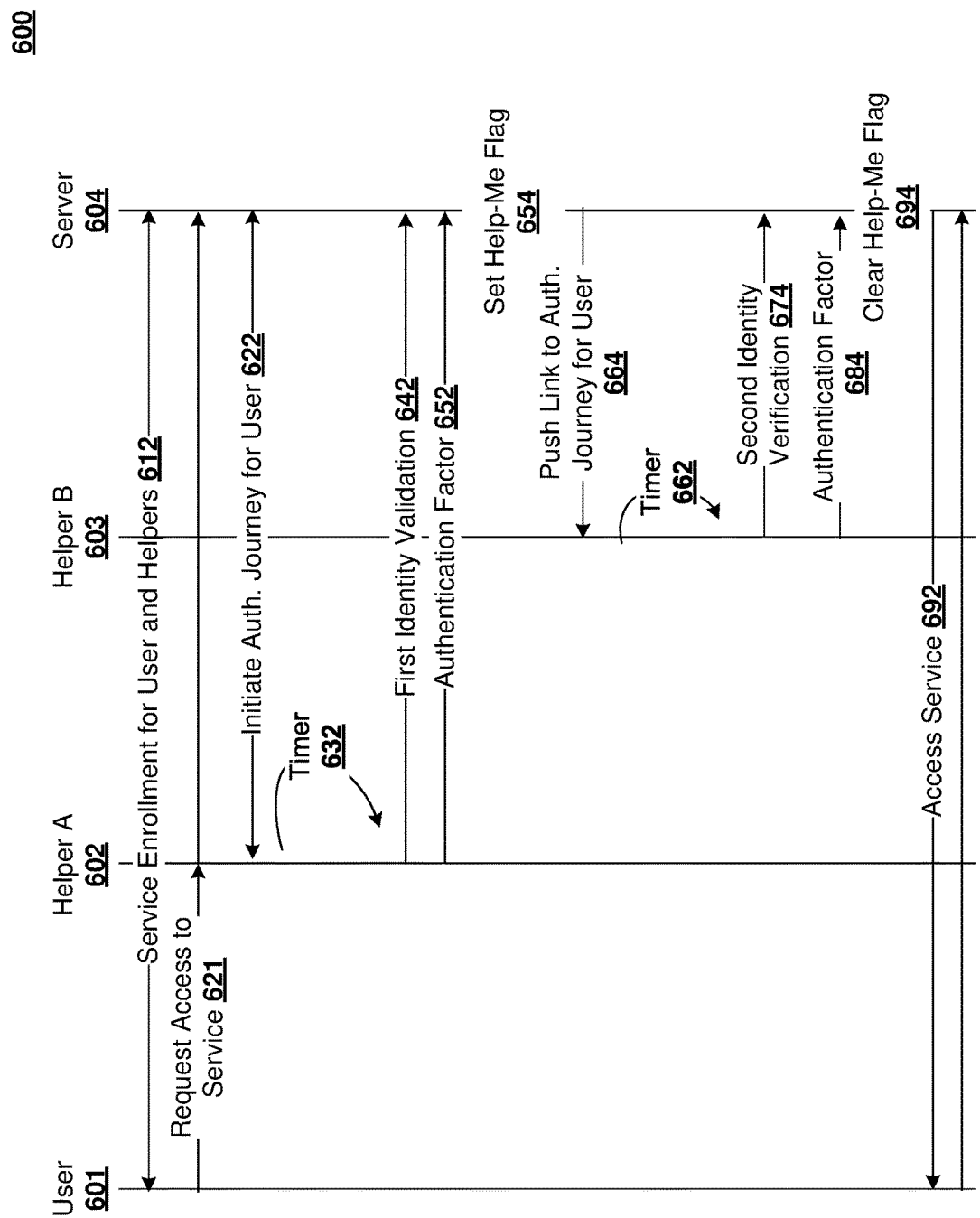
FIG. 6 is a message flow diagram for a peer recovery procedure for a user requesting authentication involving two helpers.

FIGS. 5A, 5B and 6 further illustrate various implementations of the authentication journey with a recovery procedure.

FIG. 5A is a message flow diagram 500A for a peer recovery procedure initiated by a helper 502 on behalf of a user 501 requesting authentication. Diagram 500A comprises user 501, helper 502, and server 503. Server 503 is an authentication journey server associated with one or more services available to user 501 and helper 502.

In operation 512, both user 501 and helper 502 are enrolled for the service. During operation 512, user 501 enrolls a number of authentication factors that can be used for authentication of user 501 facilitated by server 503 in future access requests. Accordingly, helper 502 undergoes the same enrollment process. At a point in time following operation 512, helper 502 has been contacted by user 501 (e.g., via video call) to request that helper 502 initiates an authentication journey and recovery procedure on their behalf. In operation 514, helper 502 initiates the authentication journey on behalf of the user 501. A timer 524 begins that will time out the authentication request if the helper 502 does not respond in a pre-determined amount of time. In an operation 534, helper 502 provides a first identity validation for the user 501, as well as authenticating their own identity in operation 544 (alternatively, operation 544 may occur before or simultaneously with operation 534). The message exchange could include verification from the helper that the helper has had a reliable interaction with the user that is considered to minimize the likelihood of a deep fake. Following the helper 502 successfully initiating the recovery procedure and validating the identity of user 501, a help me flag is set in operation 555, shifting the authentication journey back to user 501. A link is pushed to the user 501 in operation 554 so the user 501 can access the authentication journey via their email (e.g., if the user cannot access their registered device). A timer 564 begins that will time out the authentication request if the user 501 does not respond in a pre-determined amount of time. The user 501 may have access to at least one authentication factor (e.g., a PIN) that is provided to the server 503 in operation 574 as a second identity validation. Server 503 approves the identity validation and clears the help-me flag in operation 584. In operation 594, user 501 is granted access to the service. In some implementations, user 501 is also prompted to reset their authentication factor at this point.

FIG. 5B is a message flow diagram 500B for a peer recovery procedure initiated by a user 501 requesting authentication. Diagram 500B comprises a user 501, helper 502, and server 503. Server 503 is an authentication journey server associated with one or more services available to user 501 and helper 502.

In operation 512, both user 501 and helper 502 are enrolled for the service. During operation 512, user 501 enrolls a number of authentication factors that can be used for authentication of user 501 facilitated by server 503 in future access requests. Accordingly, helper 502 undergoes the same enrollment process. At a point in time following operation 512, user 501 requests access to a service in operation 522. By requesting access to the service, user 501 is also initiating an authentication journey with server 503.

Within the scenario represented in diagram 500B, user 501 has lost access to an authentication factor; hence, user 501 is unable to independently authenticate their identity in a two-factor authentication process. However, user 501 does have access to at least one authentication factor. In operation 523, authentication proceeds with a recovery procedure in order to enable user 501 to regain access to the service. A timer 531 is started that will time out the authentication journey if a response is not provided by the user 501 in a pre-defined amount of time. The server 503 requests a first identity validation in operation 532 from the user 501, and in response, the user 501 provides an authentication factor in operation 542. As a result of the recovery procedure being initiated in operation 522, a help-me flag is set in operation 543. The help-me flag set in operation 543 adjusts the path of the authentication journey to no longer request the lost authentication factor from user 501, and instead, request an identity validation from a second helper user on behalf of the user after the helper authenticates their own identity. In operation 553, the server 503 pushes a recovery link to helper 502. A timer 562 is started that will time out the authentication journey if a response is not provided by the helper 502 in a pre-defined amount of time. The recovery link directs helper 502 to authenticate their own identity, then validate the identity on behalf of user 501 in operation 563. The message exchange could include verification from the helper that the helper has had a reliable interaction with the user, such as a video conference, that is considered to minimize the likelihood of a deep fake. Once the identity validation is received by the server 503, server 503 can approve the identity validation and clear the help-me flag in operation 573, followed by user 501 receiving an approval for their authentication request in operation 582.

In a scenario involving two factor authentication where the user does not have access to either authentication factor, two helpers may be used on behalf of the user. FIG. 6 shows an implementation of the technology disclosed involving two helpers.

FIG. 6 is a message flow diagram 600 for a peer recovery procedure for a user 601 requesting authentication involving two helpers 602 and 603. Diagram 600 comprises user 601, helper A 602, helper B 603, and server 604. Server 604 is an authentication journey server associated with one or more services available to user 601 and helper 602. User 601 needs to access a service that requires two-factor authentication, but they do not have access to either authentication factor.

In operation 612, user 601, helper A 602, helper B 603 are enrolled for the service. During operation 612, user 601 enrolls both authentication factors that can be used for authentication of user 601 facilitated by server 604 in future access requests. Accordingly, helper A 602 and helper B 603 undergo the same enrollment process. At a point in time following operation 612, helper A 602 and helper B 603 have each been individually contacted by user 601 (e.g., in-person or a video call) to request their assistance in an authentication journey with a recovery process. In diagram 600, user 601 is unable to initiate the authentication journey without one or both of the lost authentication factors (e.g., a registered device) available and requests that helper A 602 starts the authentication journey on their behalf. In other implementations, user 601 is able to connect to the authentication server 604 (e.g., via a secure web portal on an Internet connected device) and initiate the journey themselves.

In operation 621, helper A 602 communicates the access request from user 601 on their behalf to the server 604. Because the request is helper-initiated, the authentication journey automatically begins with the recovery procedure. Server 604 starts the authentication journey for user 601 in operation 622. A timer 632 begins that will time out the authentication request if the helper A 602 does not respond in a pre-determined amount of time. In an operation 642, helper A 602 provides a first identity validation for the user 601, as well as authenticating their own identity in operation 652 (alternatively, operation 652 may occur before or simultaneously with operation 642). The message exchange could include verification from the helper that the helper has had a reliable interaction with the user that is considered to minimize the likelihood of a deep fake. Following the helper A 602 successfully initiating the recovery procedure and validating the identity of user 601, a help me flag is set in operation 654, shifting the authentication journey over to helper B 603 for the next stage in the authentication journey.

A link is pushed to helper B 603 in operation 664, the link directing helper B 603 to continue the authentication journey. A timer 662 begins that will time out the authentication request helper B 603 does not respond in a pre-determined amount of time. In an operation 674, helper B 603 provides a second identity validation for the user 601, as well as authenticating their own identity in operation 684 (alternatively, operation 684 may occur before or simultaneously with operation 674). The message exchange could include verification from the helper that the helper has had a reliable interaction with the user that is considered to minimize the likelihood of a deep fake. Following successful identity validation for user 601 from both helper A 602 and helper B 603, the help me flag is cleared in operation 694. In operation 692, user 601 is granted access to the service. In some implementations, user 601 is also prompted to reset at least one authentication factor at this point.

User 601 can be allowed to enroll more than two helpers in many implementations of the technology disclosed. The number of helpers allowed may be equal to the number of required authentication factors for an authentication journey. Otherwise, the number of helpers may be limited so that a user 601 is only able to utilize a peer recovery procedure for a pre-determined number of authentication factors before an administrative recovery procedure is required. For example, in a three-factor authentication process, a user may be allowed to use one helper for one authentication factor (or two helpers for two authentication factors) but if all three authentication factors are inaccessible to the user, the user is required to contact an administrator (e.g., IT) for heightened security procedures in response to the situation. In contrast to limitations defined by numbers of authentication factors, limitations may be defined by type of authentication factor. For example, a user may be allowed to use a helper in the event that a password is lost, but if a device is lost, administrative intervention is required. A user's privilege to rely on helpers in peer trust-based recovery procedures may be dependent on other attributes of the user's account, such as security clearance or history of authentication factor loss.

In one implementation, a user may be able to register more helpers than there are required authentication factors so that a back-up helper is available if another helper is not. Helpers may be pre-registered to validate the user's identity as a substitution for one specific authentication factor, or in response to the loss of any authentication factor by the user. The user may be able to select one or more helpers from a list of helpers at each identity validation stage of the authentication journey, or helpers may be randomly selected to prevent a coordinated attack on the user's account involving a helper Alternatively, any way used to select a first or second helper can be applied to additional helpers. Moreover, there may be a maximum number of helpers allowed to be registered for a user.

Identity validation on behalf of the user, when performed by the user or a helper, may require further interaction between the user and the helper for further verification. For example, the user may be required to input an identity validation comprising a code that was pushed to the helper and communicated by the helper to the user, or vice versa. In another example, a user has lost their registered device that is typically used to obtain authentication codes from an authenticator app (e.g., Duo™, Google Authenticator™, LastPass™, ForgeRock Authenticator™, or an enterprise's internal security app) in order to authenticate. Within a recovery procedure, the user may be able to request a push notification and authentication code from the server, in which the push notification and authentication code are sent to the helper's registered device in place of the user's device, and the helper can communicate the code to the user in order to validate their identity.

Supervisor-Based Approval Procedures

In some implementations of the technology disclosed, the helper may also function as a "supervisor" user in the access control phase instead of assisting in authentication. Instead of shifting the authentication journey to the user for identity validation followed by the server automatically facilitating access control per the privileges associated with the role and/or credentials of the user requesting access, the user may successfully authenticate themselves followed by the authentication journey shifting to a supervisor for a secondary approval input in order to grant access to the user for a restricted action. Two users actively participating in the authentication journey, in contrast to a suspended authentication journey waiting for a separate and asynchronous access control journey to be completed, streamlines the process and enables "real time" secondary access approval, i.e., the supervisor approves access while the user is still engaged in an active session with the server. In some implementations, this may be configured for a use case in which the user works for an enterprise and the supervisor is their team supervisor within the enterprise. In other implementations, the user is a minor, or an elderly parent, and the supervisor is a caretaker individual monitoring the activity of the user. For example, the service may be a social media or streaming platform (e.g., for minors), a financial institution that allows for transferring money or other financial transactions, or an E-commerce platform. The service may be accessed by a website, a smart phone or tablet application, or it may be at an in-person service counter or checkout line with payment from the user's digital account.

The platform that implements supervisor approval may be distinct from the seller or it may be provided to or implemented by a seller. A credit card company, for instance, may rely on an authentication platform that supports helper secondary access approval. In this implementation, the platform is independent of and distinct from the seller and the payment method provider. It is provided by a distinct organization. Or the credit card company may install software provided for authentication that supports helper secondary access approval. The platform implemented is still provided by a distinct organization, even if it is operated by the seller or payment method. Alternatively, a marketplace may implement helper secondary access approval during checkout, either as a prerequisite to engaging with a payment method or during a payment process. In this implementation, the marketplace may develop its own platform instead of buying one from an independent party.

The range of potential applications within a professional setting and personal setting is broad. A caretaker may wish to restrict certain financial transactions to maintain a child's budget or protect an older parent from scams. Other actions may be time-restricted, such as limiting the amount of time a child is able to access their YouTube™ or TikTok™ account. These examples are strictly for illustrative purposes and should not be considered limitations of the technology disclosed. A user skilled in the art will recognize that a digital account enables users to access a number of actions that can be permissioned using access control, as well as the role of conditional permissions in access control. The technology disclosed provides several solutions to known problems within conditional access control procedures. Rule-based access control is limited by the rigidity of the defined rules for access and does not allow for exceptions under unique conditions. The disclosed technology, in contrast, allows for the supervisor to make access control decisions and set granular rules that reduce triggering of approval requests. For instance, a supervisor could limit approval requests to user transactions over $25. The supervisor would then exercise secondary approval for larger transactions). Asynchronous access control workflows are challenging to implement for restricted actions that are time-dependent, such as an attempted purchase while in line at a grocery store. Users may find it prudent to alert their supervisory helper in advance, to make sure that someone will be available for approval. In some implementations, one-time pre-approval for a dollar amount with a vendor could be arranged, as an exception to rules that trigger approval requests. Streamlining the process into one authentication flow accessible to both the user and the helper is well-suited to time critical scenarios, such as grocery stores. Additionally, a workflow that requires secondary approval for a restricted action while the user is still engaged with the authentication journey results in a higher degree of practical scrutiny for access requests than audit logs accessible to the supervisor. In comparison to a supervisor being informed of one or more restricted access requests at a later point in time while reviewing audit logs, the supervisor is informed of a restricted access request in direct response to the request being made.

A single workflow that engages the user and supervisory helper at the same time improves on workflows in which the user asks for approval then waits an indefinite time to see whether approval is forthcoming. Overlapping engagement involves a different time frame than simply requesting approval.

Consider a scenario in which a user's account was used to make repeated requests to access a restricted action. Even if the server successfully blocks these requests and/or flags the interactions, a supervisor may not be aware of the interactions and/or able to respond to the interactions until a later point in time. The technology disclosed involves a help-me flag being set, consistently or conditionally, and subsequently pushing an approval link to the supervisor, in response to each approval request triggered from the user's account. This approach to access control may better enable the supervisor to be more aware of unauthorized access attempts at an earlier point in time, contact the user to avoid potentially avoidable future attempts and/or obtain important contextual information (e.g., learn if the user's account has been compromised, or if the request(s) was/were initiated by the user, learn the circumstances leading to the request(s) and respond accordingly), adjust the settings or security of the user's account, or notify other users of a potential security risk.

A sequence of operations within a workflow for two participants in a supervised authentication journey or workflow is now described, in accordance with one implementation of the technology disclosed. The first participant is a user 701 requesting access to a restricted action (e.g., accessing a service or performing an action within the service that requires secondary approval, as determined by pre-defined access control settings) and the second user is a supervisor 702 who has previously been registered as a supervisor for secondary access approval for user 701 with regard to the service. The supervisor 702 may be a supervisor for all actions user 701 performs within the service, all restricted actions within the service, or only selected restricted action(s) within the service.

In some implementations, the supervisor 702 is a supervisor for user 701 within an enterprise and may be registered as the secondary approval supervisor 702 for user 701 as a result of their inherent relationship, which can be identified from an IAM database. In other implementations, the supervisor 702 is voluntarily chosen and the relationship is provided to the server 703. The relationship may be set up by user 701 or supervisor 702 and may require an agreement input to confirm the relationship by user 701 and/or supervisor 702. In some implementations, the supervisor relationship is identified by attributes of the respective user digital identities for user 701 and/or supervisor 702 defining their role and/or relationship. For example, certain digital services provide a "Family" or "Household" platform for user accounts (e.g., profiles on streaming services like Netflix™, family sharing for Apple™ IDs, Household for Amazon Prime™, and so on) through which a supervisor may be defined and/or permissions and conditional permissions can be defined for user profiles. A workflow in which the user 701 requests access to a restricted action and the supervisor 702 provides secondary approval for the restricted action is introduced below with reference to FIG. 7.

Figure 7:
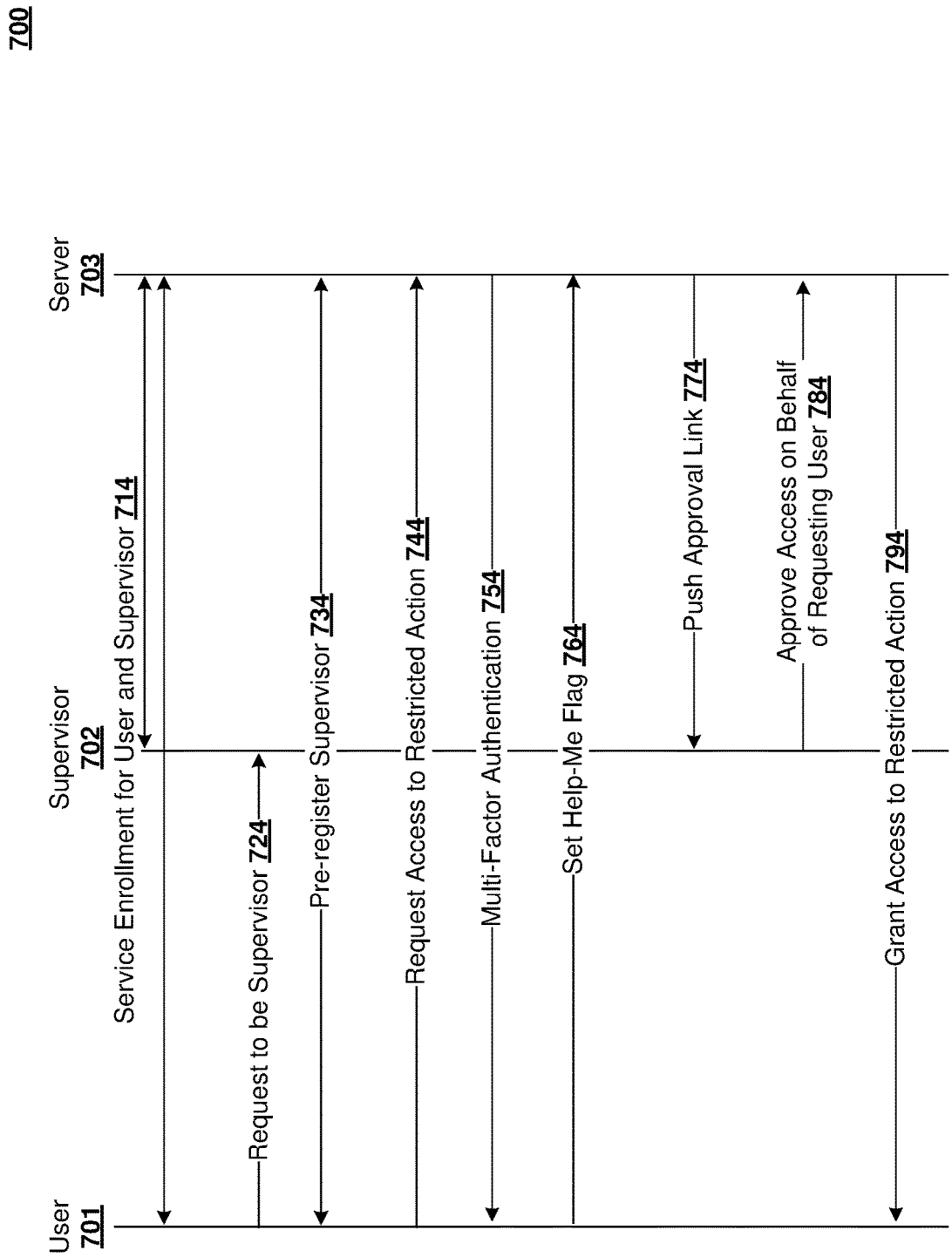
FIG. 7 is a message flow diagram for a secondary approval procedure for a user requesting access to a restricted action.

FIG. 7 is a message flow diagram 700 for a secondary approval procedure for a user 701 requesting access to a restricted action. Diagram 700 comprises user 701, supervisor 702, and server 703. Server 703 is an authentication journey server associated with one or more services available to user 701 and supervisor 702. User 701 is requesting access to an action that has been restricted such that secondary approval is required to grant access to the restricted action. In some implementations, the user 701 must always receive secondary approval for the action (e.g., viewing sensitive information or attempting a purchase). In other implementations, a conditional access restriction has been configured for user 701 such that the action requires secondary approval only if the specific parameters of the action meet a certain condition (e.g., exceeding a pre-defined limit of access requests in a week or attempting a purchase above a pre-defined maximum dollar amount).

In operation 714, user 701 and supervisor 702 are enrolled for the service. During operation 714, user 701 enrolls both authentication factors that can be used for authentication of user 701 facilitated by server 703 in future access requests. During the initialization and configuration of their user account, user 701 is authorized to access certain services within a platform and actions within respective services so that certain permissions and/or restrictions are delegated to user 701 in accordance with an access policy. The access policy may be defined by a supervisor who has also been enrolled with the service and has been delegated permissions to define access policies for other users, or another authority associated with the service, organization, enterprise, et cetera. Accordingly, supervisor 702 undergoes the same enrollment process.

In one implementation of the technology disclosed, the supervisor 702 is registered with the service as a user and receives a request to act as the supervisor for restricted actions for user 701. For example, at a point in time following operation 714, user 701 initiates a supervisory relationship with supervisor 702 by requesting that supervisor 702 acts as the supervisor for their restricted access requests in operation 724. Subsequently, in operation 734, supervisor 702 is pre-registered as the supervisor for 701 including delegating privileges to the user account of supervisor 702 enabling supervisor 702 to provide secondary approval, or deny, any access requests from user 701 for restricted actions.

In another implementation, the request is initiated by supervisor 702 instead of user 701. In yet another implementation, the supervisory relationship is defined during operation 714 so that enrollment for the service includes the pre-registration of supervisory relationships. In one example, the supervisor 702 is delegated secondary approval permissions during enrollment of the user account for supervisor 702 and during the enrollment process of the user account for user 701, supervisor 702 defines an access policy for user 701 that includes restriction of certain actions such that a secondary approval is required from supervisor 702 for access to be granted. Alternatively, the access policy may be defined from a higher-level administrator in an organization such that the supervisory relationships for access control are automatically applied to user accounts as informed by an IAM database. In a similar scenario, users may be able to register their accounts under certain classes of digital identities that are automatically delegated certain permissions and restrictions per an access policy; e.g., an administrative user, a supervisory user, a caretaker/parent/adult account, a kids account, and so on.

Returning to the description of FIG. 7, the user 701 requests access to a restricted action within the service in operation 744. User 701 may already be successfully logged in to the service and the restricted action is a particular function within the service. Alternatively, logging in to the service may be the restricted action. Operation 754 is an optional multi-factor authentication process (or single factor) that may or may not be present depending on the definition of the restricted action being requested. For example, user 701 may be attempting to log in to the service and must authenticate their identity before access control is initiated. Alternatively, user 701 may be attempting to access a restricted action that has been configured to require authentication of user identity to perform the action before access control is initiated.

A help-me flag is set within the authentication journey at operation 764 in response to the user requesting access to the restricted action. Once the help me flag is set, the server 703 consequently pushes an approval link to the supervisor 702 in operation 774. The approval link 774 may include various metadata describing the request to aid in the supervisor's decision to approve or deny the request. The supervisor 702 may provide secondary access to the requesting user in operation 784, resulting in user 701 being granted access to the restricted action in operation 794. Supervisor 702 may be required to authenticate their identity as part of the secondary approval in certain implementations. In many implementations, the access request from user 701 and the secondary approval confirmation from supervisor 702 are logged in a record, potentially including associated metadata (e.g., a timestamp, a parameter of the request, a counter for the request frequency or the request parameter, and so on) for future access or auditability.

In one implementation of the technology disclosed, the help-me flag is automatically set in operation 764 by the user device in response to the user submission of an access request for the restricted function. In another implementation, the user 701 elects to set the help-me flag. In other implementations, the server 703 sets the help-me flag in response to receipt of the user request in operation 744. Independent of whether operation 764 is initiated automatically (i.e., by the user device or server 703) or manually (i.e., by user 701 or an additional authority individual involved with the interaction such as a cashier or a bank teller), the server 703 can be prompted to push an approval link to the supervisor of record, supervisor 702, in response to the help-me flag whereby the supervisor 702 is notified of the request by receiving the approval link. In some implementations, the supervisor 702 may receive a notification from the server 703 (or the user 701 directly contacts supervisor 702) to inform them of a request. Once supervisor 702 is aware of the request, they may request the approval link from server 703. In one implementation, the supervisor 702 is notified of the request (by the user 701, the server 703, or otherwise) and is responsible for setting the help-me flag on behalf of the user in order to receive the approval link. Nodes within the authentication journey requiring interaction from the user 701 and/or the supervisor 702 may be coupled with a timer such that the request times out if a response is not provided in a pre-determined time limit.

In certain implementations, access control for a user can be further restricted by escalating the approval requirement to two or more supervisors. In some other implementations, a user may act as both a helper for a user in access recovery procedures and a supervisor for access control procedures. Within a hierarchy or collection of related individuals, there may be a chain of relationships defining helper and supervisor statuses. For example, a User X may be the supervisor for a User Y, and User Y is the supervisor for User Z. User X may be a helper for User Z and User Z may be a Helper for User Y. Users X, Y, and Z may not all be individually aware of the various helper and/or supervisory relationships of the other users.

Next, a computer system that can be used for the disclosed peer mediated access recovery or access control flows, in accordance with one implementation of the technology disclosed, is described with reference to FIG. 8.

Computer System

Figure 8:
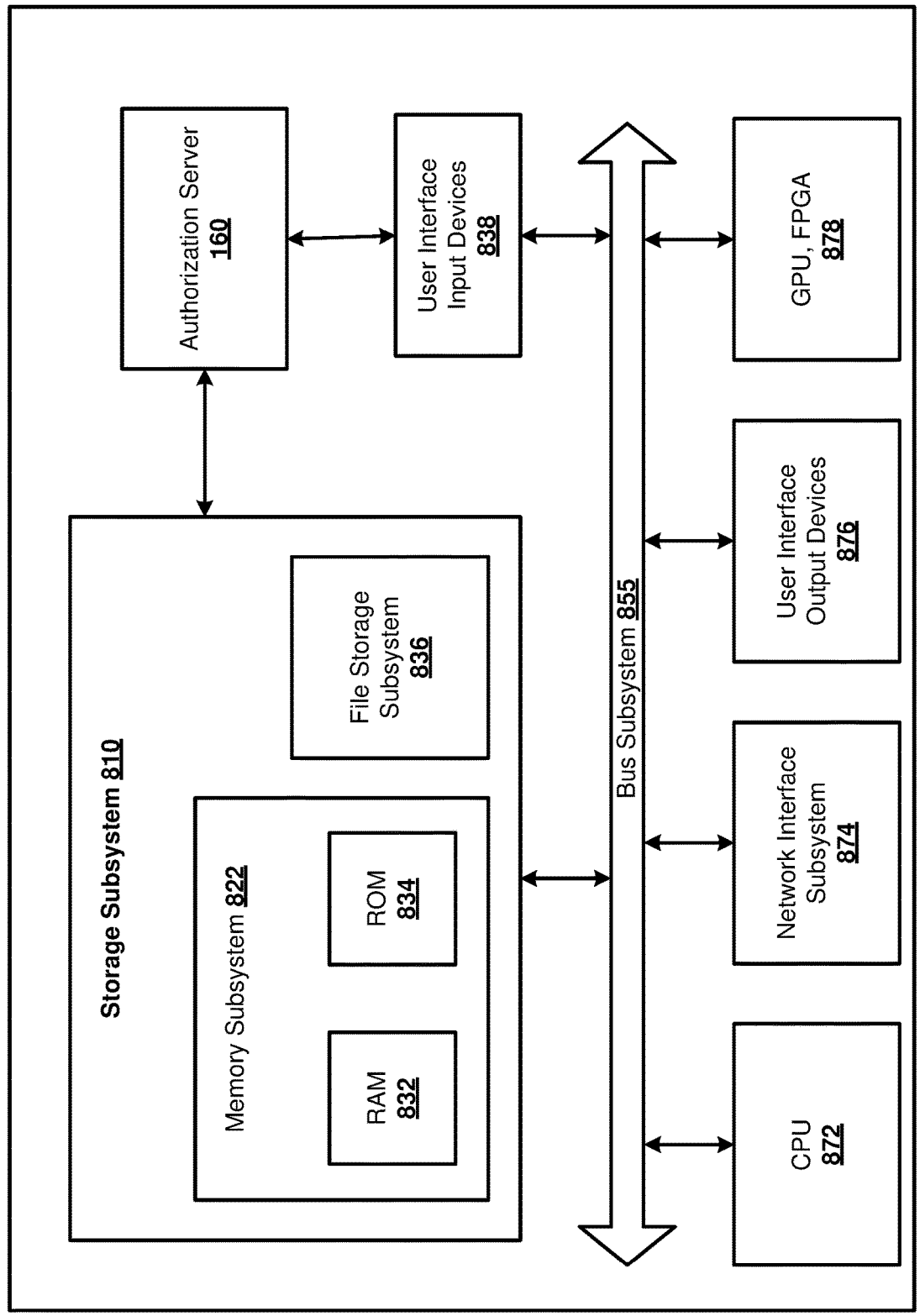
FIG. 8 is a simplified block diagram of a computer system that can be used for peer trust-based recovery procedures involving multiple users during an authentication journey, according to one implementation of the disclosed technology.

FIG. 8 is a simplified block diagram of a computer system 800 that can be used for peer trust-based recovery procedures involving multiple users during an authentication journey, according to one implementation of the disclosed technology.

Computer system 800 includes at least one central processing unit (CPU) 872 that communicates with a number of peripheral devices via bus subsystem 855 and authentication journey server 160, as described herein. These peripheral devices can include a storage subsystem 810 including, for example, memory devices and a file storage subsystem 836, user interface input devices 838, user interface output devices 876 and a network interface subsystem 874. The input and output devices allow user interaction with computer system 800. Network interface subsystem 874 provides an interface to outside networks, including an interface to corresponding interface devices in other computer systems. Authentication journey server 160 is communicably linked to the storage subsystem 810 and the user interface input devices 838.

User interface input devices 838 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 800.

User interface output devices 876 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include the possible types of devices and ways to output information from computer system 800 to the user or to another machine or computer system.

Storage subsystem 810 stores programming and data constructs that provide the functionality of the of the modules and methods described herein. Subsystem 878 can be graphics processing units (GPUs) or field-programmable gate arrays (FPGAs).

Memory subsystem 822 used in the storage subsystem 810 can include a number of memories including a main random-access memory (RAM) 832 for storage of instructions and data during program execution and a read only memory (ROM) 834 in which fixed instructions are stored. A file storage subsystem 836 can provide persistent storage for program and data files, and can include a hard disk drive, a floppy disk drive along with associated removable media, a CD-ROM drive, a DVD drive, a Blu-ray drive, an optical drive, or removable media cartridges. The modules implementing the functionality of certain implementations can be stored by file storage subsystem 836 in the storage subsystem 810, or in other machines accessible by the processor.

Bus subsystem 855 provides a mechanism for letting the various components and subsystems of computer system 800 communicate with each other as intended. Although bus subsystem 855 is shown schematically as a single bus, alternative implementations of the bus subsystem can use multiple busses.

Computer system 800 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 800 depicted in FIG. 8 is intended only as a specific example for purposes of illustrating the preferred embodiments of the present invention. Many other configurations of computer system 800 are possible having more or fewer components than the computer system depicted in FIG. 8.

Some Particular Implementations

We describe various implementations for a method of enabling a user to recover from a loss of an authentication factor required by a multi-factor authentication journey to access a service. One method includes an authentication journey receiving a request to initiate an authentication journey from a helper on behalf of a user. The helper has been pre-registered to assist in access recovery procedures for the user. The request from the helper includes an authentication of the helper and a first identity validation of the user. In some implementations, the helper transmitting the request and authenticating themselves may serve as identity validation for the user. In other implementations, a further input confirmation on behalf of the user may be required from the helper (e.g., a form in which the helper provides further information about the recovery circumstances). Once the helper successfully requests an authentication journey to be initialized on behalf of the user, a help-me flag is set for the authentication journey and an authentication link is pushed to the user that directs the user to the authentication journey. The help-me flag is set by the helper in some implementations, while in other implementations, the server automatically sets the help-me flag in response to the helper's request. Responsive to the pushed authentication link, the user provides a second identity validation for themselves. This may be an additional authentication factor such as a security question. Alternatively, the identity validation may require the user to obtain, from the helper, a one-time-use PIN that has been sent to the helper and the user must input this PIN in order to successfully validate their identity. Once the second identity validation is approved, the help-me flag is cleared, and the user is granted access to the service.

In many implementations, the authentication journey server allows the pre-registered helper to initiate the authentication journey for the user. In one implementation, the user is prompted to enroll a new authentication factor, i.e., reset their authentication factor(s), following a successful recovery procedure and access approval to the service.

Certain implementations include pushing to the pre-registered helper a confirmation link for making a request to confirm the user-provided second identity validation in order to clear the help-me flag. In some implementations, after the user provides a second identity validation, the pre-registered helper is pushed a link in order to approve the user-provided identity validation in order to clear the help-me flag. In one implementation, a first helper performs a first identity validation via authenticating themselves, the user performs a second identity validation using a pushed link, and a second helper provides a third identity validation by approving the user-provided second identity validation via a pushed link.

In many implementations of the disclosed technology, the pre-registered helper has been previously enrolled with the service and registered as a helper via a voluntary agreement with the user. In some implementations, the pre-registered helper has been previously enrolled due to an established relationship with the user within an organization structure, and further includes the authentication journey server accessing the organization structure from an identity and access management database. In many implementations, the granting includes pushing an access link to the user following the approval of the second identity validation, wherein the access link directs the user towards the service.

Another disclosed method of enabling a user to recover from a loss of an authentication factor required by a multi-factor authentication journey to access a service includes an authentication journey server receiving, from the user, a request to initiate an authentication journey for the user utilizing a recovery procedure engaging a pre-registered helper, the request including at least one authentication factor of the user, wherein the request to initiate serves as a first identity validation of the user. Also included is setting a help-me flag for a helper branch of the authentication journey and pushing, to the helper, an authentication link for the authentication journey, while the user remains engaged with the authentication journey. Further included is receiving, from the helper, responsive to the pushed authentication link, a second identity validation for the user while the user still remains engaged with the authentication journey, approving the second identity validation of the user and clearing the help-me flag, and granting the user access to the service.

For some implementations, the authentication journey server allows the pre-registered helper to participate in the authentication journey for the user utilizing the recovery procedure after the user loses the authentication factor. For many implementations, the pushed link includes a request to approve the user-provided first identity validation. In some cases, the pre-registered helper has been previously enrolled with the service and registered as a helper via a voluntary agreement with the user.

For many implementations, the pre-registered helper has been previously enrolled due to an established relationship with the user within an organization structure, and further includes the authentication journey server accessing wherein the organization structure from an identity and access management database. Many implementations also include pushing, to the user, an access link following the approval of the helper-provided second identity validation, wherein the access link directs the user towards the service. In some cases, the access link includes a request for the user to provide at least one additional authentication factor in order to access the service. In some implementations, the access link includes a request for the user to register a replacement for the lost authentication factor.

An additional disclosed method of enabling a user to recover from a loss of a first authentication factor and a second authentication factor that both are required in order to access a service comprises an authentication journey server receiving, from a first pre-registered helper on behalf of the user, a request to initiate an authentication journey for the user utilizing a recovery procedure, the request including an authentication of the first helper, wherein the request to initiate serves as a first identity validation of the user. The method also includes setting a help-me flag for the authentication journey and pushing, to a second pre-registered helper, a link for the authentication journey. Further included is receiving, from the second helper responsive to the pushed link, an authentication of the second helper, wherein the second helper's authentication serves as a second identity validation of the user. Additionally included is approving the first and second identity validations of the user and clearing the help-me flag, and granting the user access to the service.

In many implementations, the authentication journey server allows the first helper to initiate the authentication journey for the user utilizing the recovery procedure after the user loses one authentication factor and allows the second helper to participate in the authentication journey for the user utilizing the recovery procedure after the user loses two authentication factors.

Some implementations also include pushing to the second helper a link including a request to approve the second identity validation in order to clear the help-me flag. In many cases, the first and second helpers have each been previously enrolled with the service and registered as a helper via a voluntary agreement with the user. In some implementations, the first and second helpers have each been previously enrolled due to an established relationship with the user within an organization structure, and further include the authentication journey server accessing the organization structure from an identity and access management database.

For many implementations of the disclosed technology, the first helper belongs to a first branch of the organizational structure and the second helper belongs to a second branch of the organizational structure, and the first branch has a non-overlapping team or leadership from the second branch. Some implementations include pushing, to the user, an access link following the approval of the second identity validation, wherein the access link directs the user towards the service. In some cases the access link includes a request for the user to register a replacement for both lost authentication factors.

A disclosed method of obtaining secondary approval for a request to initiate a restricted action during a first active session between a user and a service, the method includes an authorization server receiving, from the user, a request to initiate the restricted action within the first active session, and receiving, from a supervisor who has been notified of the request to initiate the restricted action, an invocation of a second active session between the supervisor and the authorization server that is jointly active with the first active session between the user and the authorization server, wherein the supervisor is previously enrolled with the service and authorized to grant the user access to the restricted action. The method also includes obtaining an approval from the supervisor for the request to initiate the restricted action while the user remains actively engaged in the first active session, and granting the user access to the restricted action in response to the approval from the supervisor.

For some implementations of the disclosed method, the service is a financial institution, a shopping vendor, an entertainment service, or a social media platform. In some cases, the restricted action includes accessing a particular resource or initiating a particular transaction. In many implementations, the restricted action is unconditionally restricted, such that the approval from the supervisor is always required for the user to access the restricted action. In some disclosed implementations, the restricted action is conditionally restricted, such that the approval from the supervisor is required when a particular pre-determined threshold has been met, wherein the threshold is at least one of a maximum monetary limit, a maximum time limit, a request frequency, and a supervisor-created requirement rule. In some cases, the method also includes pushing to the supervisor a link including a request to approve the user access to the restricted action. Some implementations can further include the receiving from the supervisor happening without the authentication server prompting the supervisor regarding the restricted action.

In certain implementations, the registration of a helper relationship within the service is a voluntary agreement between the user and a helper that has been chosen by the user. Some implementations may include rules limiting who the user is able to select as a helper. Other implementations include the helper being chosen (hence, registration of the helper relationship) in dependence upon pre-defined relationships within an organization, such as extracting relationships from an IAM platform accessible to the authentication journey server.

Some implementations further include rules dictating allowable relationships between multiple helpers for the same user, such as a number of degrees of separation that must exist between a first helper and a second helper within the organizational structure.

In one implementation, the user is granted access to the service by pushing an access link to the user that directs the user towards the service.

Many implementations require the user to know at least one authentication factor. Other implementations allow for respective helpers to validate the user's identity in response to a lost authentication factor for all required authentication factors; i.e., two helpers facilitating a recovery procedure for two-factor authentication, three helpers facilitating a recover procedure for three-factor authentication, and so on.

For some implementations of the disclosed technology, the access link includes a request for the user to provide at least one additional authentication factor in order to access the service. In some cases, the access link includes a request for the user to register a replacement for the lost authentication factor.

A method implementation of the technology disclosed includes the user initiating the authentication journey using a recovery procedure. Another implementation includes the helper initiating the authentication journey and recovery procedure on behalf of the user. Many implementations comprise the user requesting assistance from the helper, either to initiate or complete the authentication journey and recovery procedure, via a direct communication method. The communication can be in-person communication, email or instant message, a phone call, a video call, and so on. Methods that are difficult for an impersonator to use, such as video calls or in-person communication, are preferable.

Other implementations may include tangible non-transitory computer readable storage media including program instructions loaded into memory that, when executed on processors, cause the processors to implement the operations to perform a method as described above. Yet another implementation may include a system including memory and one or more processors operable to execute instructions, stored in the memory, to perform a method as described above.

Some implementations of the disclosed method include the first helper belonging to a first branch of the organizational structure and the second helper belonging to a second branch of the organizational structure, wherein the first branch has a non-overlapping team or leadership from the second branch.

Computer readable media (CRM) implementations of the technology disclosed include a non-transitory computer readable storage medium impressed with computer program instructions, when executed on a processor, implement the methods described above.

Each of the features discussed in this particular implementation section for the first system implementation apply equally to the CRM implementation. As indicated above, all the system features are not repeated here and should be considered repeated by reference.

We describe various implementations for a system configured to enable a user to recover from a loss of a first authentication factor that is required in order to access a service, the system comprising an authentication journey server that receives, from a user, a request to initiate an authentication journey utilizing a recovery procedure, and from a helper, an identity validation of the user, in order to approve access for the user. In alternative implementations, the authentication journey server receives the request to initiate an authentication journey on behalf of the user utilizing the recovery procedure from the helper instead of the user. The authentication journey server pushes links to the user and/or the helper in order to facilitate switching between the participants during the recovery procedure. In some implementations, multiple helpers validate the user in response to the user losing access to multiple authentication factors.

A method implementation of the technology disclosed includes obtaining secondary approval for a request to initiate a restricted action during a first active session between a user and a service. The method includes an authorization server receiving a request to initiate the restricted action within the first active session from the use and receiving an invocation of a second active session by a supervisor (after the supervisor has been notified of the request) between the supervisor and the authorization service while the first active session remains active, wherein the supervisor is previously enrolled with the authorization service and authorized to grant the user access to the restricted action. The method also includes obtaining an approval from the supervisor for the request to initiate the restricted action and granting the user access to the restricted action in response to the approval from the supervisor.

Other implementations may include a non-transitory computer readable storage medium storing instructions executable by a processor to perform a method as described above. Yet another implementation may include a system including memory and one or more processors operable to execute instructions, stored in the memory, to perform a method as described above.

For some implementations, a user is requesting access to a restricted action within a service, wherein the service is a financial institution, a shopping vendor, an entertainment service, or a social media platform. The restricted action may be accessing a particular resource or initiating a particular transaction. In some implementations, the action may be unconditionally restricted such that performing the action always requires approval from the supervisor, while in other implementations, the action is conditionally restricted such that a particular condition is met to instigate a required secondary approval. For example, a user's account access to purchasing transactions may be unconditionally restricted such that the supervisor approval is always required, or the access may be conditionally restricted such that the supervisor approval is only required when the purchase is above a pre-determined maximum cost limit. Examples of other conditionally-restricted actions may be a child, via their user account, requesting to access Netflix™ after they have already watched the maximum number of hours allowed that week, an older parent, via their user account, requesting to transfer money via a Western Union™ above a $50 limit, or a purchase transaction at a store that is not on a list of approved stores.

Further implementations include the supervisor being notified of the request via a link from the authentication journey server. Other implementations include the supervisor being notified of the request via direct contact from the user requesting access.

In some implementations, a first user may participate as both a helper and a supervisor for a second user.

Computer readable media (CRM) implementations of the technology disclosed include a non-transitory computer readable storage medium impressed with computer program instructions, when executed on a processor, implement the methods described above.

Each of the features discussed in this particular implementation section for the first system implementation apply equally to the CRM implementation. As indicated above, all the system features are not repeated here and should be considered repeated by reference.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Other implementations may include a non-transitory computer readable storage medium storing instructions executable by a processor to perform a method as described above. Yet another implementation may include a system including memory and one or more processors operable to execute instructions, stored in the memory, to perform a method as described above.

I claim:

1. A computer-implemented method of enabling a user to recover from a loss of an authentication factor required by a multi-factor authentication journey to access a service, the computer-implemented method including:
an authentication journey server receiving, from a pre-registered helper on behalf of the user, a request to initiate an authentication journey for the user utilizing a recovery procedure, the request including an authentication of the pre-registered helper, wherein the request to initiate serves as a first identity validation of the user;
setting a help-me flag for the authentication journey and pushing, to the user, an authentication link for the authentication journey;
receiving from the user responsive to the pushed authentication link, a second identity validation for the user;
approving the second identity validation of the user and clearing the help-me flag; and
granting the user access to the service.

2. The computer-implemented method of claim 1, wherein the authentication journey server allows the pre-registered helper to initiate the authentication journey for the user.

3. The computer-implemented method of claim 1, wherein the pre-registered helper has been previously enrolled with the service and registered as a helper via a voluntary agreement with the user.

4. The computer-implemented method of claim 1, wherein the pre-registered helper has been previously enrolled due to an established relationship with the user within an organization structure, and further including the authentication journey server accessing the organization structure from an identity and access management database.

5. The computer-implemented method of claim 1, wherein the granting further includes pushing an access link to the user following the approval of the second identity validation, wherein the access link directs the user towards the service.

6. The computer-implemented method of claim 5, wherein the access link includes a request for the user to register a replacement for a lost authentication factor.

7. A system for enabling a user to recover from a loss of an authentication factor required by a multi-factor authentication journey to access a service, the system including a processor, memory coupled to the processor and program instructions to implement the computer-implemented method of claim 1 when loaded into the memory.

8. The system of claim 7, wherein the authentication journey server allows the pre-registered helper to initiate the authentication journey for the user.

9. A tangible non-transitory computer-readable storage media, including program instructions loaded into memory that, when executed on processors, cause the processors to implement the computer-implemented method of claim 1.

10. A computer-implemented method of enabling a user to recover from a loss of an authentication factor required by a multi-factor authentication journey to access a service, the computer-implemented method including:
an authentication journey server receiving, from the user, a request to initiate an authentication journey for the user utilizing a recovery procedure engaging a pre-registered helper, the request including at least one authentication factor of the user, wherein the request to initiate serves as a first identity validation of the user;
setting a help-me flag for a helper branch of the authentication journey and pushing, to the pre-registered helper, an authentication link for the authentication journey, while the user remains engaged with the authentication journey;
receiving, from the pre-registered helper, responsive to the pushed authentication link, a second identity validation for the user while the user still remains engaged with the authentication journey;
approving the second identity validation of the user and clearing the help-me flag; and
granting the user access to the service.

11. The computer-implemented method of claim 10, wherein the pre-registered helper has been previously enrolled with the service and registered as a helper via a voluntary agreement with the user.

12. The computer-implemented method of claim 10, wherein the pre-registered helper has been previously enrolled due to an established relationship with the user within an organization structure, and further including the authentication journey server accessing the organization structure from an identity and access management database.

13. The computer-implemented method of claim 10, further including pushing, to the user, an access link following the approval of the second identity validation, wherein the access link directs the user towards the service and includes a request for the user to provide at least one additional authentication factor in order to access the service.

14. A system for enabling a user to recover from a loss of an authentication factor required by a multi-factor authentication journey to access a service, the system including a processor, memory coupled to the processor and program instructions to implement the computer-implemented method of claim 10 when loaded into the memory.

15. The system of claim 14, further including pushing, to the user, an access link following the approval of the second identity validation, wherein the access link directs the user towards the service and includes a request for the user to provide at least one additional authentication factor in order to access the service.

16. A tangible non-transitory computer-readable storage media, including program instructions loaded into memory that, when executed on processors, cause the processors to implement the computer-implemented method of claim 10.

17. A computer-implemented method of enabling a user to recover from a loss of a first authentication factor and a second authentication factor that both are required in order to access a service, the computer-implemented method comprising:
- an authentication journey server receiving, from a first pre-registered helper on behalf of the user, a request to initiate an authentication journey for the user utilizing a recovery procedure, the request including an authentication of the first pre-registered helper, wherein the request to initiate serves as a first identity validation of the user;
- setting a help-me flag for the authentication journey and pushing, to a second pre-registered helper, a link for the authentication journey;
- receiving, from the second pre-registered helper responsive to the pushed link, an authentication of the second pre-registered helper, wherein the authentication of the second pre-registered helper serves as a second identity validation of the user;
- approving the first and second identity validations of the user and clearing the help-me flag; and
- granting the user access to the service.

18. The computer-implemented method of claim 17, wherein the authentication journey server allows the first pre-registered helper to initiate the authentication journey for the user utilizing the recovery procedure after the user loses one authentication factor and allows the second pre-registered helper to participate in the authentication journey for the user utilizing the recovery procedure after the user loses two authentication factors.

19. The computer-implemented method of claim 17, wherein the first and second pre-registered helpers have each been previously enrolled with the service and registered as a helper via a voluntary agreement with the user.

20. The computer-implemented method of claim 17, wherein the first and second pre-registered helpers have each been previously enrolled due to an established relationship with the user within an organization structure, and further including the authentication journey server accessing the organization structure from an identity and access management database.

21. The computer-implemented method of claim 20, wherein the first pre-registered helper belongs to a first branch of the organization structure and the second pre-registered helper belongs to a second branch of the organization structure, and wherein the first branch has a non-overlapping team or leadership from the second branch.

22. The computer-implemented method of claim 17, further including pushing, to the user, an access link following the approval of the second identity validation, wherein the access link directs the user towards the service and includes a request for the user to register a replacement for both the first authentication factor and the second authentication factor.

23. A system for enabling a user to recover from a loss of a first authentication factor and a second authentication factor that both are required in order to access a service, the system including a processor, memory coupled to the processor and program instructions to implement the computer-implemented method of claim 17 when loaded into the memory.

24. The system of claim 23, wherein the authentication journey server allows the first pre-registered helper to initiate the authentication journey for the user utilizing the recovery procedure after the user loses one authentication factor and allows the second pre-registered helper to participate in the authentication journey for the user utilizing the recovery procedure after the user loses two authentication factors.

25. A tangible non-transitory computer-readable storage media, including program instructions loaded into memory that, when executed on processors, cause the processors to implement the computer-implemented method of claim 17.

* * * * *